US012777055B2

(12) United States Patent
Zhang et al.

(10) Patent No.: US 12,777,055 B2
(45) Date of Patent: Oct. 27, 2026

(54) SYSTEM MONITORING METHOD AND APPARATUS

(71) Applicant: HUAWEI TECHNOLOGIES CO., LTD., Shenzhen (CN)

(72) Inventors: Xi Zhang, Shenzhen (CN); Hanbing Liu, Shenzhen (CN); Hsinwei Wu, Shenzhen (CN); Tianying Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 18/826,223

(22) Filed: Sep. 6, 2024

(65) Prior Publication Data

US 2024/0430286 A1 Dec. 26, 2024

Related U.S. Application Data

(63) Continuation of application No. PCT/CN2023/077014, filed on Feb. 18, 2023.

(30) Foreign Application Priority Data

Mar. 18, 2022 (CN) ......................... 202210273416.5

(51) Int. Cl.
*H04L 29/06* (2006.01)
*H04L 9/40* (2022.01)

(52) U.S. Cl.
CPC ................................ *H04L 63/1425* (2013.01)

(58) Field of Classification Search
CPC ............. H04L 63/1425; G06F 11/3409; G06F 11/3447; G06F 11/0751; G06F 11/3495; G06F 11/3452; G06F 11/302; G06F 11/3051; G06F 11/3058; G06F 11/3093
See application file for complete search history.

(56) References Cited

U.S. PATENT DOCUMENTS

| | | | | |
|---|---|---|---|---|
| 2018/0210942 | A1* | 7/2018 | Patil | G06F 16/285 |
| 2020/0371892 | A1 | 11/2020 | Huang et al. | |
| 2023/0291668 | A1* | 9/2023 | Valente | H04L 43/0864 |
| 2024/0062120 | A1* | 2/2024 | He | G06N 20/20 |
| 2024/0163185 | A1* | 5/2024 | Patel | H04L 41/0677 |
| 2024/0193068 | A1* | 6/2024 | Li | G06F 11/3452 |
| 2025/0165376 | A1* | 5/2025 | Karis | G06F 9/547 |

FOREIGN PATENT DOCUMENTS

| | | | |
|---|---|---|---|
| CN | 107154950 | A | 9/2017 |
| CN | 107302547 | A | 10/2017 |
| CN | 111178456 | A | 5/2020 |

* cited by examiner

*Primary Examiner* — Ka Shan Choy

(57) ABSTRACT

In a system monitoring method, a monitoring server extracts a plurality of features based on a plurality of data slices corresponding to a to-be-detected time period, where data of one of the data slices includes data in the to-be-detected time period. The monitoring server groups the plurality of features into a plurality of feature groups, and uses the plurality of feature groups as input data of an anomaly detection model. The monitoring server determines, based on a detection result of the anomaly detection model, whether the monitored indicator is abnormal.

18 Claims, 10 Drawing Sheets

| Feature | MODEL1 (feature group 1) | MODEL2 (feature group 3) | MODEL3 (feature group 3) | MODEL4 (feature group 4) | MODEL5 (feature group 5) | MODEL6 (feature group 6) | MODEL7 (feature group 7) | MODEL8 (feature group 8) | MODEL9 (feature group 9) |
|---|---|---|---|---|---|---|---|---|---|
| last_current_diff | √ | √ | √ | √ | √ | √ | | | |
| last_day_diff | √ | √ | √ | √ | √ | √ | | | |
| last_week_diff | √ | √ | √ | √ | √ | √ | | | |
| MA_N1 | √ | | | | | | √ | | |
| MA_N2 | | √ | | | | | | √ | |
| MA_N3 | | | √ | | | | | | √ |
| last_diff_ma_N1 | | | | √ | | | √ | | |
| last_diff_ma_N2 | | | | | √ | | | √ | |
| last_diff_ma_N3 | | | | | | √ | | | √ |
| last_diff_ma_N1' | | | | √ | | | √ | | |
| last_diff_ma_N2' | | | | | √ | | | √ | |
| last_diff_ma_N3' | | | | | | √ | | | √ |
| last_diff_ma_N1" | | | | √ | | | √ | | |
| last_diff_ma_N2" | | | | | √ | | | √ | |
| last_diff_ma_N3" | | | | | | √ | | | √ |
| EWMA_N3 (α=0.3) | √ | | | √ | | | √ | | |
| EWMA_N3 (α=0.5) | | √ | | | √ | | | √ | |
| EWMA_N3 (α=0.7) | | | √ | | | √ | | | √ |

FIG. 7

SYSTEM MONITORING METHOD AND APPARATUS

CROSS-REFERENCE TO RELATED APPLICATIONS

This application is a continuation of International Patent Application No. PCT/CN2023/077014, filed on Feb. 18, 2023, which claims priority to Chinese Patent Application No. 202210273416.5, filed on Mar. 18, 2022. The disclosures of the aforementioned applications are hereby incorporated by reference in their entirety.

TECHNICAL FIELD

This application relates to the field of computer technologies, and in particular, to a system monitoring method and apparatus.

BACKGROUND

In the IT operation and management field, ensuring stability and availability of an IT system is a key task of operation and management. By closely monitoring fluctuation of an indicator of an IT system, operation and management personnel can identify a potential breakdown risk of the system. In the industry, an operation of monitoring these indicators is referred to as anomaly detection.

Currently, an anomaly detection method is disclosed in a conventional technology. In the method, a statistical algorithm is used to guess distribution of a monitored indicator. If a value of the monitored indicator exceeds an assumed distribution range, it is considered that the monitored indicator is abnormal, and an alarm is made; or if the value of the monitored indicator is in the assumed distribution range, it is considered that the monitored indicator is normal, and no alarm is made.

In the foregoing algorithm, a fluctuation mode of a monitored indicator offline needs to be learned. A fluctuation model may be reflected in a change rule of a data sequence of the monitored indicator, for example, a seasonal change rule. Then, a detection algorithm with a good detection effect is selected based on the fluctuation mode of the monitored indicator. A common problem of this type of algorithm is that once a fluctuation mode of the data sequence changes, this type of algorithm becomes ineffective in detection. For example, a conditional VAE model in a type E algorithm is only used to detect whether an anomaly occurs in a data sequence with a seasonal change rule, and a detection effect on a data sequence with another change rule is poor. However, change modes of a same monitored indicator or different monitored indicators (such as utilization of a CPU and response duration of an application) of different IT systems (such as an e-commerce IT system and an email security system) are different. Even in a same IT system, change modes of a same monitored indicator do not remain unchanged with a system environment change, a service volume increase, network instability, and performance iteration.

It may be learned that the foregoing anomaly detection algorithm has problems of a single scope of application, algorithm selection difficulty, and low accuracy.

SUMMARY

This application provides a system monitoring method and apparatus, to resolve a problem of algorithm selection difficulty, and also improve usability and accuracy of an anomaly detection algorithm.

According to a first aspect, embodiments of this application provide a system monitoring method. The method may be performed by a monitoring server. In the method, the monitoring server obtains time series data of a monitored indicator in a to-be-detected time period; extracts a plurality of features based on a plurality of data slices corresponding to the to-be-detected time period, where the plurality of data slices include to-be-detected slices, and data of one of the to-be-detected slices includes the time series data of the monitored indicator in the to-be-detected time period; and separately uses a plurality of feature combinations as input data of an anomaly detection model, and the monitoring server 110 determines, based on a detection result of the anomaly detection model, whether the monitored indicator is abnormal, where one detection result indicates whether the monitored indicator is abnormal; and one of the feature combinations includes a part or all of the plurality of features.

According to the foregoing method, the monitoring server extracts the plurality of features based on the plurality of data slices corresponding to the to-be-detected time period, where data of one data slice includes data in the to-be-detected time period. The monitoring server groups the plurality of features into a plurality of feature groups, and separately uses the plurality of feature groups as the input data of the anomaly detection model. The anomaly detection model outputs one detection result based on one feature group. Each detection result indicates that an anomaly detection mode speculates whether the monitored indicator is abnormal. The monitoring server determines, based on the detection result output by the anomaly detection model, whether the monitored indicator is abnormal. In this application, a plurality of detection results may be determined based on the plurality of feature groups, and different feature groups may be used to capture different anomaly modes, so that a plurality of systems or a plurality of monitored indicators can be applied, and whether the monitored indicator is abnormal is determined based on the plurality of detection results. This avoids determining, by using a single algorithm, whether the monitored indicator is abnormal, and may improve accuracy and usability of anomaly detection.

In a possible implementation, the plurality of features include a time feature, and the time feature identifies a feature value of the monitored indicator in the to-be-detected time period.

In a possible implementation, the plurality of features include a difference feature, and the difference feature identifies a feature value of a difference between data of the monitored indicator in the to-be-detected time period and data of the monitored indicator in another time period.

In a possible implementation, the plurality of features include a sequence feature, and the sequence feature identifies a feature value of data in one data slice of the monitored indicator.

In a possible implementation, the plurality of features include a statistical feature, and the statistical feature identifies a distribution feature of the monitored indicator in different data slices.

According to the foregoing method, a plurality of types of features of the monitored indicator are extracted, and a change mode of the monitored indicator is reflected through a plurality of dimensions. This helps improve accuracy of anomaly detection.

In a possible implementation, the data of the to-be-detected slice further includes historical time series data in a period of time before to-be-detected time series data; and the time feature includes one or more of the following:

an average value of the to-be-detected time series data; and an average value of historical same-period data of the to-be-detected time series data;

the difference feature includes one or more of the following:

a difference between the to-be-detected time series data and the historical time series data in the to-be-detected slice;

a difference between the to-be-detected time series data and the historical same-period data; and an average value of a difference between data at a same location in the to-be-detected slice and a historical same-period slice of the to-be-detected slice; and the sequence feature includes one or more of the following:

an average value of the data in the to-be-detected slice;

a standard deviation of the data in the to-be-detected slice;

an average value of the data in the historical same-period slice of the to-be-detected slice; and an exponential weighted moving average value of the data in the to-be-detected slice.

In a possible implementation, one of the to-be-detected slices is obtained by sliding a time window with one preset length on a time series data column of the monitored indicator based on a specified step; and preset lengths of time windows corresponding to different to-be-detected slices are different.

According to the foregoing method, a historical slice is continuously updated with an update of the to-be-detected time period. In this way, a new anomaly mode is also continuously learned by the anomaly detection model with the update of the to-be-detected time period.

In a possible implementation, the plurality of data slices further include a historical same-period slice of each of one or more to-be-detected slices; and a time interval between one of the to-be-detected slices and the historical same-period slice of the to-be-detected slice is N days, and N is set to one or more preset positive integers.

According to the foregoing method, features are extracted based on the historical same-period slice of the to-be-detected slice, to reflect a historical normal fluctuation model of the monitored indicator, and these features are used as input data of the anomaly detection model. In this way, the historical slice is continuously updated with an update of the to-be-detected time period, and a new anomaly mode is continuously learned by the anomaly detection model with the update of the to-be-detected time period. This improves accuracy and adaptability of the anomaly detection model. Specifically, there is an interval between the to-be-detected slice and the historical same-period slice by N days, and N may be set to a plurality of preset positive integers, to reflect a fluctuation mode of the monitored indicator one day ago, a fluctuation mode one week ago, and a fluctuation mode one month ago. This helps detect various periodic (a day, a week, a month, and the like) anomalies, trend anomalies, and the like.

In a possible implementation, one of the plurality of feature combinations is input data of one or more anomaly detection models; different feature combinations are input data of different anomaly detection models; and each anomaly detection model outputs one detection result; and the determining, based on a detection result output by the anomaly detection model, whether the monitored indicator is abnormal includes: If a quantity of detection results indicating that the monitored indicator is abnormal in detection results output by all anomaly detection models reaches a preset threshold, the monitoring server determines that the monitored indicator is abnormal; or if a quantity of detection results indicating that the monitored indicator is abnormal in detection results output by all anomaly detection models does not reach a preset threshold, the monitoring server determines that the monitored indicator is not abnormal.

According to the foregoing method, whether the monitored indicator is abnormal is determined based on the detection results of the plurality of anomaly detection models. Compared with a manner in which a single anomaly detection algorithm is used, accuracy is higher, and adaptability is stronger.

In a possible implementation, algorithms of a part or all of the plurality of anomaly detection models are different, or algorithms of a part or all of the plurality of anomaly detection models are the same, but values of parameters in the algorithms are different; and algorithms of the plurality of anomaly detection models include an unsupervised algorithm.

According to the foregoing method, the unsupervised algorithm may be used for the anomaly detection model in this application. In this way, operation and management personnel do not need to provide a labeled sample (for example, an abnormal sample), and do not need to perform offline training by using the abnormal sample. Because it is difficult to obtain the abnormal sample and the abnormal sample is variable, the method may reduce a burden of the operation and management personnel. In addition, different unsupervised algorithms may be further used for the plurality of anomaly detection models, so that a problem of algorithm selection difficulty may be resolved. In addition, when the plurality of anomaly detection models use a same unsupervised algorithm, parameters in algorithms of the different anomaly detection models may have different values, and an effect of automatic parameter adjustment is implemented through grid parameter setting, without a need to adjust a complex parameter. This achieves high usability.

According to a second aspect, embodiments of this application further provide a system monitoring apparatus. The system monitoring apparatus has a function of implementing the monitoring server in the method embodiment of the first aspect. For beneficial effects, refer to the description of the first aspect. Details are not described herein again. The function may be implemented by hardware, or may be implemented by hardware executing corresponding software. The hardware or the software includes one or more modules corresponding to the foregoing function. In a possible design, a structure of the system monitoring apparatus includes an obtaining module, a feature extraction module, and a detection module. These modules may perform corresponding functions of the monitoring server in the method of the first aspect. For details, refer to detailed descriptions in the method example. Details are not described herein again. For beneficial effects, refer to the description of the first aspect. Details are not described herein again.

According to a third aspect, embodiments of this application further provide a computing device. The computing device has a function of implementing the monitoring server in the method embodiment of the first aspect. For beneficial effects, refer to the description of the first aspect. Details are not described herein again. A structure of the device includes a processor and a memory, and optionally, may further include a communication interface. The processor is configured to support the computing device in performing a corresponding function of the monitoring server in the method of the first aspect. The memory is coupled to the processor, and the memory stores computer program instructions and data (for example, time series data of a monitored indicator) that are necessary for the communication apparatus. The structure of the computing device further includes a communication interface, configured to communicate with another device, for example, receive the time series data of the monitored indicator. For beneficial effects, refer to the description of the first aspect. Details are not described herein again.

According to a fourth aspect, this application further provides a computer-readable storage medium. The computer-readable storage medium stores instructions; and when the instructions are run on a computer, the computer is enabled to perform the method for the monitoring server of the first aspect and possible implementations of the first aspect. For beneficial effects, refer to the description of the first aspect. Details are not described herein again.

According to a fifth aspect, this application further provides a computer program product including instructions. When the computer program product is run on a computer, the computer is enabled to perform the method performed by the monitoring server of the first aspect and possible implementations of the first aspect. For beneficial effects, refer to the description of the first aspect. Details are not described herein again.

According to a sixth aspect, this application further provides a computer chip. The chip is connected to a memory, and the chip is configured to read and execute a software program stored in the memory, to perform the method of the first aspect and possible implementations of the first aspect. For beneficial effects, refer to the description of the first aspect. Details are not described herein again.

According to a seventh aspect, embodiments of this application further provide a system, and the system includes a computing device and a monitoring server. The computing device is configured to send time series data of a monitored indicator to the monitoring server. The monitoring server has a function of implementing the monitoring server in the method embodiment of the first aspect. For beneficial effects, refer to the description of the first aspect. Details are not described herein again.

In this application, based on implementations according to the foregoing aspects, the implementations may be further combined to provide more implementations.

BRIEF DESCRIPTION OF DRAWINGS

FIG. 7 is a schematic diagram of a division method for a feature group according to an embodiment of this application;

DESCRIPTION OF EMBODIMENTS

This application provides a monitoring method. The monitoring method may be used as a monitoring service, and a user may purchase the monitoring service to monitor an IT system of the user. Specifically, the monitoring service may be used to monitor any indicator of any object included in the IT system, and speculate, through data of a monitored indicator, whether the indicator is abnormal, to help operation and maintenance personnel identify a potential risk of the IT system, and ensure stability and availability of the IT system.

Figure 1:
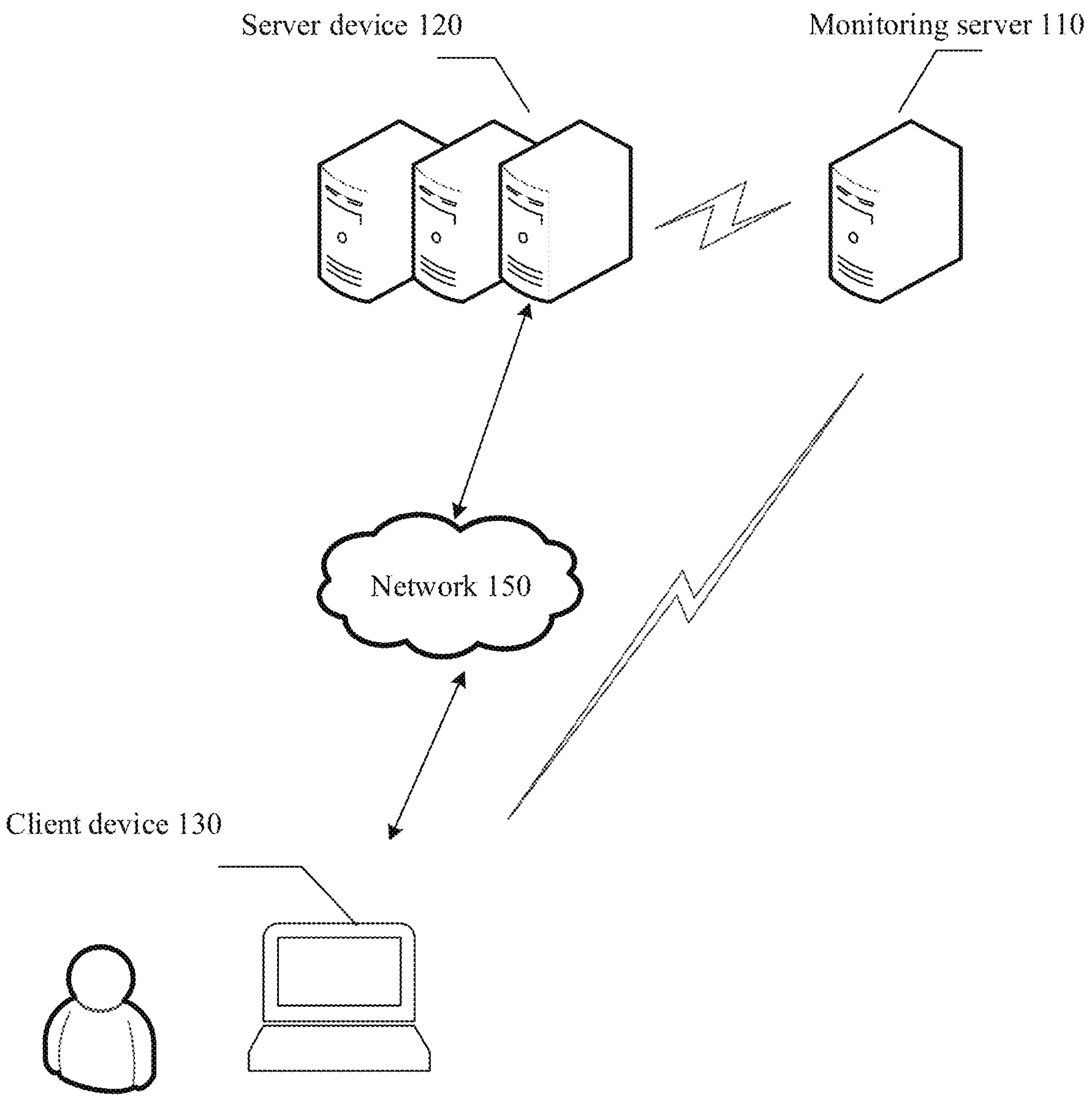
FIG. 1 is a schematic diagram of a possible architecture of a system according to an embodiment of this application.

The IT system may be a system including one computing device, or may be a system including a plurality of computing devices. FIG. 1 is a schematic diagram of an architecture of a monitoring system according to an embodiment of this application. As shown in FIG. 1, the monitoring system 10 includes a monitoring server 110 and an IT system 20. The IT system 20 includes at least one server device 120, and optionally, further includes at least one client device 130.

The client device 130 is deployed on a user side, and may be a physical machine, or may be a virtual machine. The physical machine includes but is not limited to a desktop computer, a server, a laptop, and a mobile device (such as a mobile phone). The client device 130 may communicate with the server device 120 through a network 150. The network 150 generally represents any telecommunication or computer network, including, for example, an intranet, a wide area network (WAN), a local area network (LAN), a personal area network (PAN), or the internet.

The user may access data through software (such as an application) running on the client device 130. For example, the user operates an application (app for short) to trigger the client device 130 to generate a data access instruction, and send the generated data access instruction to the server device 120, to access data through the server device 120. An application deployed in the client device 130 is client software, server software of the application runs in the server device 120, and the server device 120 processes the data access instruction from the client device 130 through the server software. For example, the application running in the client device 130 includes a web page browser, and the user triggers, through the web page browser, the client device 130 to generate and send a web page access request. The web page access request is used to request to read a target web page. Server software of the web page browser runs on the server device 120, and the server device 120 obtains the target web page based on the server software of the web page browser, and returns the target web page to the client device 130. A time period from sending the data access instruction (for example, a web page access request) to receiving a response (for example, the target web page) by the client device 130 may be referred to as response duration of the application (for example, the web page browser), or a time period from receiving the data access instruction (for example, the web page access request) by the server device 120 to sending the response (for example, the target web page) is referred to as the response duration of the application (for example, the web page browser).

The server device 120 runs the server software of the application, and is configured to process the data access instruction triggered by client software of the application on the client device 130. The server device 120 may be an independent computing device, or may be a node in a storage system. The storage system may be a central storage system, or may be a distributed storage system. A structure of the node may be integration of storage and compute, or may be separation of storage and compute. The integration of storage and compute means that the node has both a computing capability and a storage capability. For example, the server device 120 has a hard disk 115, and the hard disk 115 is configured to store the target web page. When processing the web page access request sent by the client device 130, the server device 120 obtains the target web page from the local hard disk 115 of the server device 120, and sends the target web page to the client device 130. The separation of storage and compute means that the computing capability and the storage capability are separately deployed on different nodes. For example, the storage system includes a node (denoted as a computing node) having the computing capability and a node (denoted as a storage node) having the storage capability. For example, the server device 120 is one computing node, and the target web page is stored in the storage node. When processing the web page access request sent by the client device 130, the server device 120 obtains the target web page from the storage node, and sends the target web page to the client device 130.

It should be noted that the foregoing application is merely an example. The server device 120 may further run server software of another application, for example, one or more server software such as an email server, a file server, a database server, and a game server. This is not limited in this application.

A monitoring server 110 is configured to perform the system monitoring method provided in embodiments of this application. For example, the monitoring server 110 may be configured to monitor any indicator of any object included in the IT system 20, and detect, by performing anomaly detection on data of the indicator, whether the indicator (or an object) is abnormal. The object may be any software or hardware included in the IT system 20, and an indicator of the object may be any indicator indicating performance of the object.

Optionally, the system monitoring method provided in this application may also be performed by a plurality of servers. For example, a server cluster including a plurality of servers or a distributed system performs the foregoing system monitoring method. For ease of description, the following embodiment is described by using an example in which the monitoring server 110 performs the execution.

Figure 2:
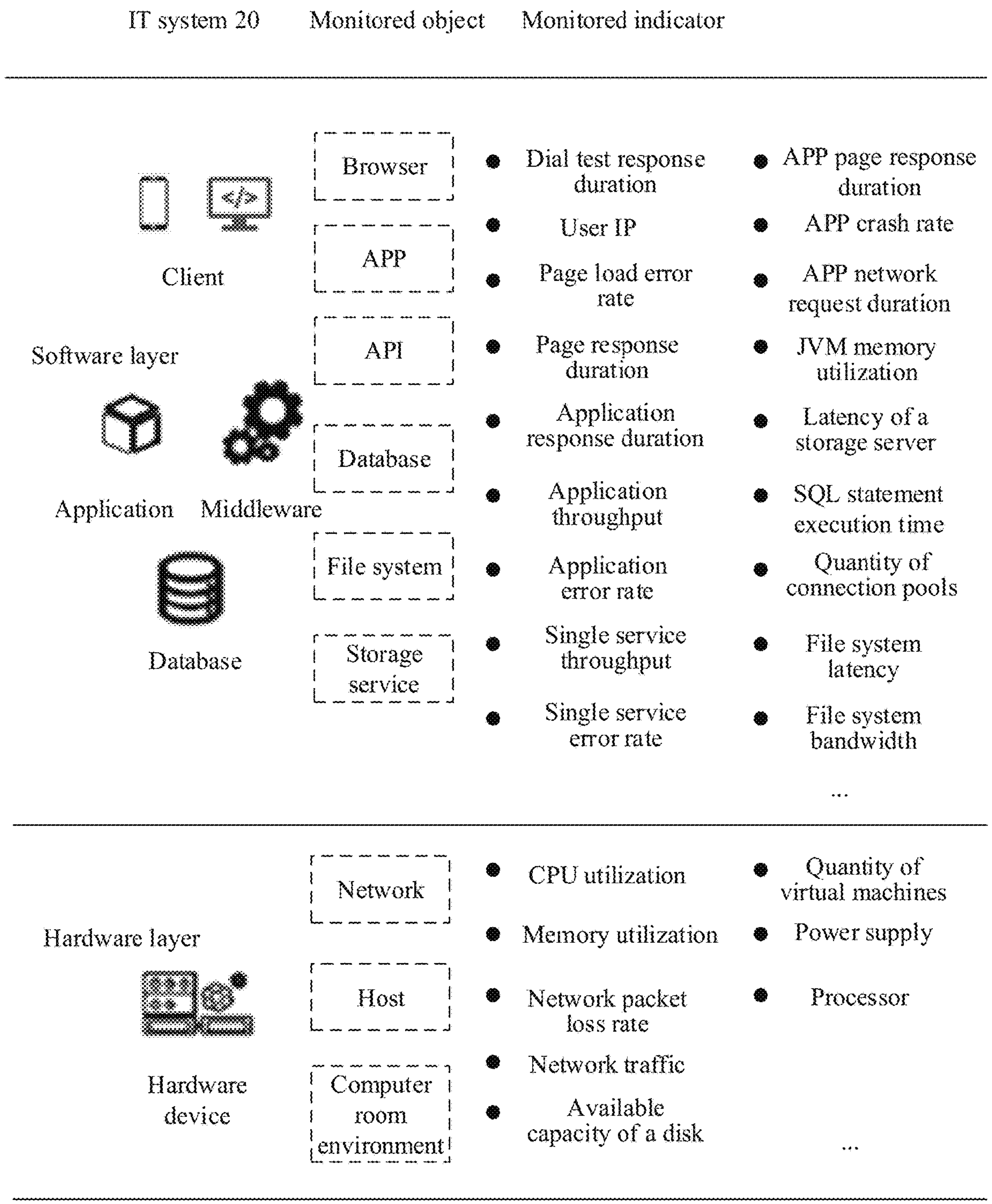
FIG. 2 is a schematic diagram of an architecture of an IT system.

FIG. 2 shows an example of an object and an object indicator included in an IT system 20. As shown in FIG. 2, the IT system 20 includes a hardware layer, a software layer, and the like. The hardware layer includes components that form a hardware architecture of the IT system 20, for example, components (such as a CPU, a memory, and a hard disk, and these components are described below) of a server device 120 and components that form a network 150. Optionally, the hardware layer may further include components (such as the CPU and the memory) of a client device 130. A hardware indicator includes an indicator indicating hardware performance, such as CPU utilization, memory utilization, network traffic, a network packet loss rate, disk utilization, and a quantity of virtual machines. The software layer includes software that forms a software architecture of the IT system 20, for example, software running on the server device 120, and specifically, server software of various applications. The software indicator includes an indicator indicating software performance, for example, response duration of an application, an application error rate, APP page response duration, and a page loading error rate, which are not listed one by one herein. For the response duration of the application, refer to the foregoing description. For other indicators, refer to records of the conventional technology. Details are not described herein again. It should be noted that FIG. 2 shows only a part of an architecture included in the IT system 20. The IT system 20 in this application may further include another object and an object indicator. For example, the hardware layer or the software layer may further include another indicator. For another example, the IT system 20 may further include another layer, for example, a service layer. The service layer includes an object such as a service or a process. The service indicator includes indicators such as a contract quantity and a service volume. Any indicator generated in the IT system is applicable to embodiments of this application.

In this application, the monitoring server needs to monitor specific indicators of specific objects, and may be set by a user who purchases the monitoring service (which is described below). For ease of description, an object that needs to be monitored is referred to as a monitored object, and an indicator that needs to be monitored is referred to as a monitored indicator below. There may be one or more monitored objects, and there may also be one or more monitored indicators.

For example, one monitored object may be one object in the server device 120, and one monitored indicator may be one indicator of one monitored object in the server device 120, for example, CPU utilization, memory utilization, and an available capacity of a disk of the server device 120. For another example, response duration, an application error rate, response duration of a single service, throughput of a single service, and an error rate of a single service of an application on the server device 120. For another example, one monitored object may be one object in the client device 130, and one monitored indicator may be one indicator of one monitored object in the client device 130, for example, CPU utilization of the client device 130 and memory utilization of the client device 130. For another example, response duration, an application error rate, and the like of the application in the client device 130. For another example, one monitored object may be the network 150, and one monitored indicator may be one indicator of the monitoring network 150, for example, the network packet loss rate or the network traffic.

A device (for example, the server device 120 or the client device 130) to which the monitored object belongs has a function of communicating with the monitoring server 110. Using the server device 120 as an example, the server device 120 collects data of each monitored indicator and structures the data into time series data (time series data for short) of a specific granularity. The server device 120 sends the time series data of the monitored indicator to the monitoring server 110. The monitoring server 110 performs the system monitoring method provided in this application: performing anomaly detection on the received time series data of the monitored indicator, to detect whether the monitored indicator (or a monitored object indicated by the monitored indicator) is abnormal. It should be understood that the monitored indicator may indicate whether the monitored object runs stably. If the monitored indicator is abnormal, it may also indicate that the monitored object indicated by the monitored indicator may be abnormal.

Figure 3:
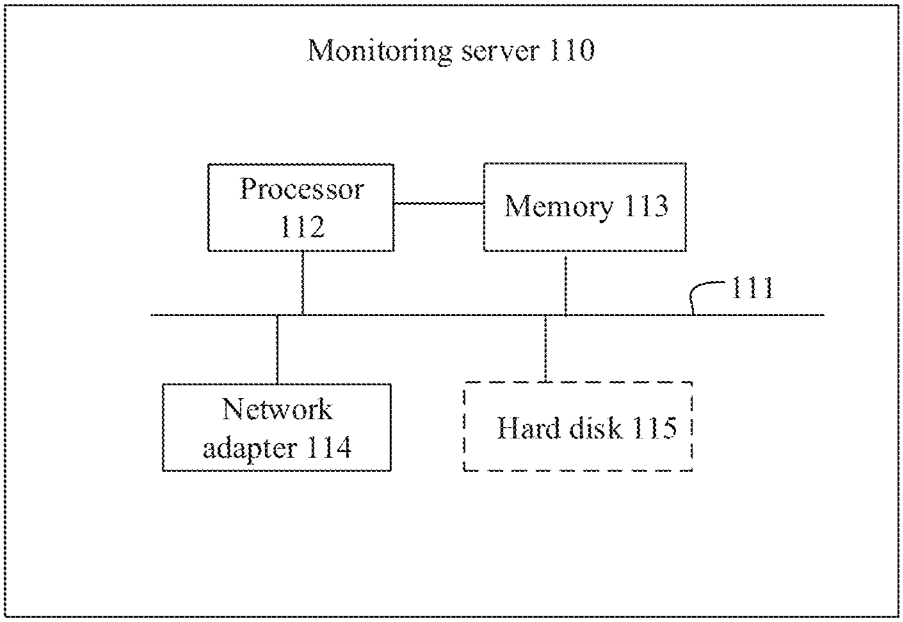
FIG. 3 is a schematic diagram of a structure of a monitoring server 110 according to an embodiment of this application.

Specifically, FIG. 3 is a schematic diagram of an architecture of a monitoring server 110 according to an embodiment of this application. As shown in FIG. 3, the monitoring server 110 includes a bus 111, a processor 112, a memory 113, and a network adapter 114. The processor 112, the memory 113, and the network adapter 114 may be connected through the bus 111.

In addition to a data bus, the bus 111 may further include a power bus, an address bus, a control bus, a state signal bus, and the like. However, for clear description, various types of buses in the figure are marked as the bus 111. The bus 111 may be a peripheral component interconnect express (PCIe) bus, a double data rate (DDR) bus, a serial advanced technology attachment ( ) bus, a serial attached small computer system interface (SCSI) bus, a controller area network bus (CAN), an extended industry standard architecture (EISA) bus, a unified bus (unified bus, Ubus, or UB), a compute express link (CXL), a cache coherent interconnect for accelerators (CCIX), or the like.

The processor 112 may be a central processing unit (CPU), or the processor 112 may be another general-purpose processor, a digital signal processor (DSP), an application-specific integrated circuit (ASIC), a field programmable gate array (FPGA) or another programmable logic device, a discrete gate or transistor logic device, a discrete hardware component, an artificial intelligence chip, an on-chip, a graphics processing unit (GPU), or the like. It should be noted that FIG. 1 shows only one processor 112. During actual application, there are usually a plurality of processors 112, and one processor 112 has one or more processor cores. A quantity of processors 112 and a quantity of processor cores are not limited in this embodiment.

Specifically, the system monitoring method provided in embodiments of this application may be performed by the processor 112. In other words, the processor 112 may perform the system monitoring method provided in embodiments of this application by invoking a computer program instruction in the memory 113. For another example, in some possible scenarios, a computer program instruction may also be burnt on the processor 112, and the processor 112 executes the computer program instruction, to perform the system monitoring method provided in embodiments of this application.

The memory 113 may include a volatile memory, for example, a random access memory (RAM) or a dynamic random access memory (DRAM). Alternatively, the memory 113 may be a non-volatile memory, for example, a storage-class memory (SCM), or a combination of a volatile memory and a non-volatile memory. The memory 113 stores data for performing the system monitoring method in this application, for example, time series data of a monitored indicator. Optionally, the memory 113 may further include a computer program instruction for performing the system monitoring method in this application.

The network adapter 114 is configured to communicate with an external device (for example, the client device 130 or the server device 120). For example, the network adapter 114 receives time series data that is of a monitored indicator and that is sent by the server device 120. For another example, the network adapter 114 sends, to the server device 120, a detection result that is determined by the monitoring server 110 and that indicates whether the monitored indicator is abnormal.

It should be noted that a structure of the monitoring server 110 shown in FIG. 3 is merely an example. In an actual product, the monitoring server 110 may include more or fewer components. For example, the monitoring server 110 may further include an input/output device such as a keyboard, a mouse, or a display screen, and a hard disk 115. The hard disk 115 is a non-volatile memory, such as a ROM, a hard disk drive (HDD), or a solid-state drive (SSD). For another example, the memory 113 may be further located in the processor 112. A specific structure of the monitoring server 110 is not limited in embodiments of this application.

Figure 4:
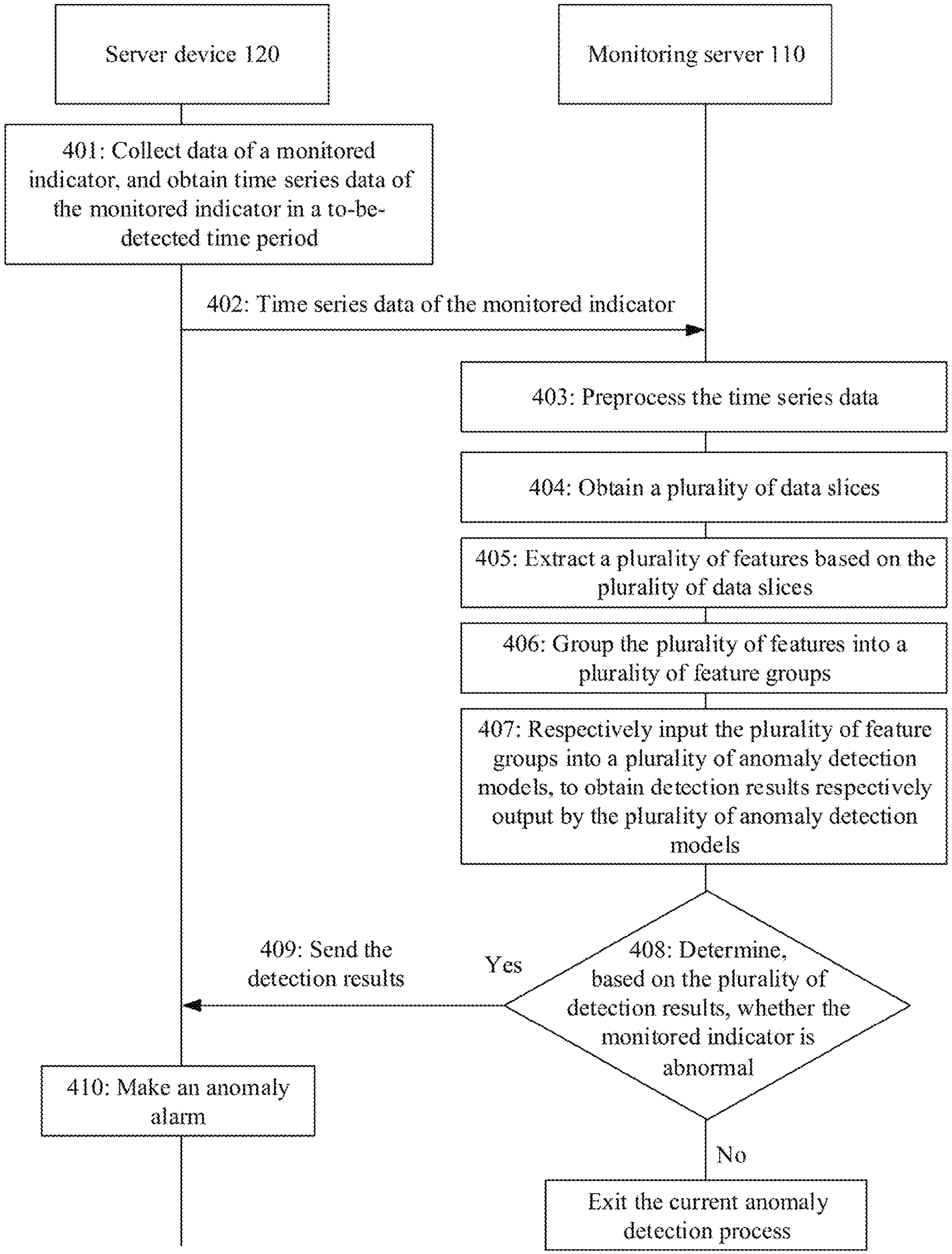
FIG. 4 is a schematic flowchart of a system monitoring method according to an embodiment of this application.

With reference to FIG. 4, the following describes in detail the method by using an example in which the system monitoring method provided in embodiments of this application is applied to the system shown in FIG. 1. Embodiments of this application include content of two aspects. A first aspect: configuring a monitoring policy. A second aspect: a system monitoring procedure (referring to the procedure steps shown in FIG. 5). Details are respectively as follows:

The first aspect: configuring the monitoring policy.

Embodiments of this application provide a monitoring parameter configuration interface. A user may set a monitoring parameter on a monitoring policy configuration interface. The monitoring parameter that may be set by the user includes but is not limited to one or more of the following: a monitored object and a monitored indicator. For the monitored object and the monitored indicator, refer to the foregoing description, and details are not described herein again. In an optional implementation, the user may set the monitoring parameter that further includes a parameter of an anomaly detection algorithm, such as a sampling interval, a detection interval, a quantity of data slices, or a length of a data slice. The sampling interval is a time interval for collecting data of the monitored indicator. A time unit of the sampling interval may be millisecond, second, minute, or the like. This is not specifically limited. For example, the monitored indicator is response duration of an application (a monitored object) on the server device 120. For example, if the sampling interval is 1 minute, the server device 120 collects an access record of the response duration of the application once every 1 minute. If the sampling interval is 5 minutes, the server device 120 collects the access record of the response duration of the application once every 5 minutes. If the sampling interval is 10 minutes, the server device 120 collects the access record of the response duration of the application once every 10 minutes. Each access record records an access time period of the user and response duration of the application. The server device 120 sorts the response duration of the application based on the access time period of the user, to obtain time series data of the monitored indicator in a period of time.

The detection interval refers to a time interval between two times of anomaly detection performed by the monitoring server 110. Similarly, a time unit of the detection interval may be millisecond, second, minute, or the like, which is not specifically limited.

A quantity of data slices and a length of the data slice are described below.

In another optional implementation, a value of a parameter of the anomaly detection algorithm may be preset, and the user does not need to set the parameter of the anomaly detection algorithm. Alternatively, the parameter of the anomaly detection algorithm may be further set on a side of the monitoring server 110, and then the monitoring server 110 sends a parameter such as the sampling interval to a device in which the monitored object is located, for example, the server device 120.

FIG. 4 is a schematic flowchart of a system monitoring method according to an embodiment of this application. The method may be performed by the monitoring server 110 shown in FIG. 1. For ease of description, the following describes the system monitoring method provided in embodiments of this application by using an example in which the monitoring server 110 monitors response duration (a monitored indicator) of an application (a monitored object) in a server device 120. As shown in FIG. 4, the method includes the following steps.

Step 401: A server device 120 collects data of a monitored indicator based on a sampling interval, and obtains time series data of the monitored indicator.

First, a relationship between the sampling interval and a detection interval is described.

In embodiments of this application, duration of the detection interval and duration of the sampling interval may be the same. For example, both the sampling interval and the detection interval are 10 minutes. Still with reference to the foregoing example, the server device 120 collects the data of the monitored indicator (for example, response duration of an application) once every 10 minutes, to obtain time series data of the monitored indicator within the 10 minutes (for example, 1:20 to 1:30), and sends the time series data within the 10 minutes to the monitoring server 110. The monitoring server 110 performs anomaly detection once every 10 minutes, for example, the monitoring server 110 performs anomaly detection once based on the received time series data of the monitored indicator sent by the server device 120 within the 10 minutes (for example, 1:20 to 1:30).

Duration of the detection interval and duration of the sampling interval may also be different. For example, the sampling interval is 5 minutes, and the detection interval is 10 minutes. Still with reference to the foregoing example, the server device 120 collects the data of the monitored indicator once every 5 minutes, to obtain time series data of the monitored indicator within the 5 minutes (for example, 1:20 to 1:25), and sends the time series data to the monitoring server 110. The monitoring server 110 does not perform anomaly detection this time. Then, after the sampling interval reaches 5 minutes, the server device 120 collects the data of the monitored indicator once again, and sends obtained time series data of the monitored indicator within the new 5 minutes (for example, 1:25 to 1:30) to the monitoring server 110. The monitoring server 110 performs anomaly detection once based on the time series data (namely, the time series data within the 10 minutes from 1:20 to 1:30) received the two times. The server device 120 may also concatenate the time series data collected the two times (to be specific, concatenate the time series data within 1:20 to 1:25 and the time series data within 1:25 to 1:30 into the time series data within 1:20 to 1:30), and then jointly send the time series data to the monitoring server 110.

It may be learned that the sampling interval is usually less than or equal to the detection interval, and the duration of the sampling interval does not affect accuracy of anomaly detection. For ease of description, an example in which the detection interval and the sampling interval are the same is used below for description.

Figure 5:
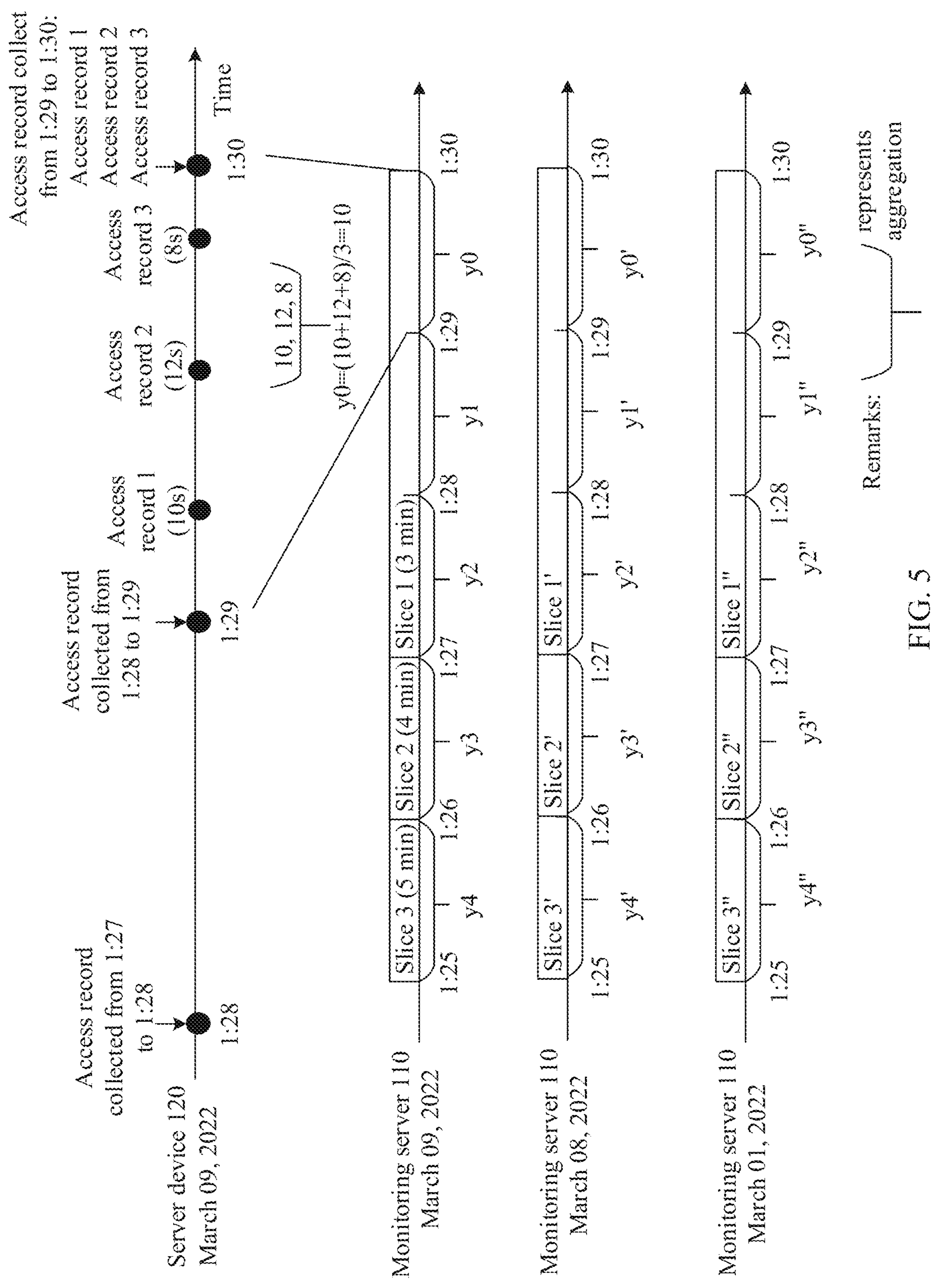
FIG. 5 is a schematic diagram of a system monitoring scenario according to an embodiment of this application.

As shown in FIG. 5, the detection interval is the same as the sampling interval, for example, both are 1 minute. The server device 120 collects the data of the monitored indicator once every 1 minute. The data includes access records of the application by one or more users within the 1 minute. For example, at 1:28, the server device 120 collects access records of the application in a time period from 1:27 to 1:28, at 1:29, the server device 120 collects access records of the application in a time period from 1:28 to 1:29, at 1:30, the server device 120 collects access records of the application in a time period from 1:29 to 1:30, at 1:31, the server device 120 collects access records of the application in a time period from 1:30 to 1:31, and the reset can be deduced by analogy. Each access record records a timestamp (for example, an access time period) and response duration of an application, and optionally may include a device identifier of a client device, an access sequence identifier, and the like. The device identifier uniquely identifies one client device, the access sequence identifier indicates an access sequence, and the access sequence identifier may be increased by one starting from an initial value (for example, 1). For example, it is assumed that the server device 120 collects three access records at 1:30:

an access record 1: {apple ID (a device identifier): 001, url_ID (an access sequence identifier): 001, timestamp (a timestamp): 1:29, time_duration (response duration of an application): 10 (unit: second)};

an access record 2: {apple ID:002, url_ID:002, timestamp: 1:29, time_duration: 12};

an access record 3: {apple ID:002, url_ID:003, timestamp: 1:29, time_duration: 8}; and the timestamp in the foregoing access record is accurate to minute. Certainly, the timestamp may further be accurate to a finer granularity, for example, second. If the timestamp is accurate to second, timestamps in the three access records may be different. For example, a timestamp in the access record 1 is 1:29:10, a timestamp in the access record 2 is 1:29:30, and a timestamp in the access record 3 is 1:29:45.

The time series data is a measurement value sequence that is captured in a period of time and that is for a change of an indicator. Data in the time series data is arranged in a time series. For example, the server device 120 sorts, based on the timestamp or the access sequence identifier, "response duration of an application" in collected access records, to obtain the time series data of the monitored indicator in the time period from 1:29 to 1:30. For example, with reference to the foregoing three access records, the time series data includes 10, 12, and 8. If there is no access record within the 1 minute, the time series data is recorded as 0. In addition, the time series data may further include the timestamp.

Step 402: The server device 120 sends the time series data of the monitored indicator to a monitoring server 110.

Step 403: After receiving the time series data of the monitored indicator, the monitoring server 110 preprocesses the time series data.

In this application, preprocessing includes but is not limited to one or more of cleaning, supplementing, and aggregation.

The cleaning may refer to removing abnormal data, where the abnormal data is, for example, a value that exceeds a preset range, for example, a negative number.

The supplementing refers to supplementing missing data. The missing data includes data that is not collected by the server device 120 or data that is not successfully received by the monitoring server 110. For example, data at a moment is missing in the time series data sent by the server device 120. For example, it is assumed that a sampling interval is 1 minute and a detection interval is 10 minutes, the server device 120 sends data once every 10 minutes instead of sending data once every 1 minute, for example, sending time series data once in a time period from 1:30 to 1:40. The time series data lacks data (namely, the missing data) at a moment of 1:31. For example, the time series data is: {1:30 (10, 12, 8), 1:32 (10, 10, 10, 10), 1:33 (0), 1:34 (12, 9), 1:35 (9, 9, 9), . . . , 1:40 (8)}. It should be noted that 0 in the time series data is not the missing data, but there is no access record of the application in a time period from 1:32 to 1:33.

The monitoring server 110 supplements the missing data. A supplementing manner may be adding 0s, adding data of a previous point, adding a median, or the like. This is not specifically limited. The median is also referred to as a median, and is a number at a middle position in a group of data arranged in sequence. For example, in the foregoing time series data, data (9, 9, 9) at the moment of 1:35 is the median. For example, if a manner of adding 0s is used, in the foregoing example, the time series data obtained after 0s are added to the missing data in the foregoing time series data is: {1:30 (10, 12, 8), 1:31 (0), 1:32 (10, 10, 10, 10), 1:33 (0), 1:34 (12, 9), 1:35(9, 9, 9, . . . , 1:40 (8)}. If a manner of adding data of a previous point is used, time series data obtained after the foregoing time series data is added is: {1:30 (10, 12, 8), 1:31 (10, 12, 8), 1:32 (10, 10, 10, 10), 1:33 (0), 1:34 (12, 9), 1:35 (9, 9, 9), . . . , 1:40 (8)}. If a manner of adding a median is used, time series data obtained after the foregoing time series data is added is: {1:30 (10, 12, 8), 1:31 (9, 9, 9), 1:32 (10, 10, 10, 10), 1:33 (0), 1:34 (12, 9), 1:35 (9, 9, 9, . . . , 1:40 (8)}.

Aggregation is to structure, based on a preset time unit, (time series) data collected by the server device 120 into time series data of a specific granularity. For example, the time unit is 1 minute, and the monitoring server 110 aggregates the received time series data in a unit of 1 minute. For example, an aggregation operation is to obtain an average value of data within the 1 minute. It is assumed that to-be-aggregated time series data is: {1:30 (10, 12, 8), 1:31 (9, 9, 9), 1:32 (10, 10, 10, 10), 1:33 (0), 1:34 (12, 9), 1:35(9, 9, 9, . . . , 1:40 (8)}, and the aggregated time series data is: {1:30[(10+12+8)/3=10], 1:31[(9+9+9)/3=9], 1:32[(10+10+10+10)/4=10], 1:33 (0), 1:34[(12+9)/2=10.5], 1:35[(9+9+9)/3=9], . . . , 1:40 (8)}. For another example, if the time unit is 2 minutes, the to-be-aggregated time series data is aggregated into {1:31[(10+12+8+9+9+9)/6=9.5], 1:33[(10+10+10+10)/4=10], 1:35 (12+9+9+9+9)/5=9.6, . . . }. For ease of description, the following uses an example in which a time unit of the aggregation is 1 minute for description.

It should be noted that there is no strict time series limitation between a supplementing operation and an aggregation operation. For example, the supplementing operation may be performed before the aggregation operation, or the aggregation operation may be performed before the supplementing operation. The aggregation operation may also be performed by the server device 120.

In an implementation, after obtaining the preprocessed time series data, the monitoring server 110 writes the preprocessed time series data into a database. In this way, when the time series data needs to be read, the time series data may be read from the database. Similarly, the monitoring server 110 may further read other historical time series data of the monitored indicator from the database.

Step 404: The monitoring server 110 obtains a plurality of data slices corresponding to a to-be-detected time period.

When a detection time point is reached, to be specific, when a time interval from previous anomaly detection reaches a preset detection interval, the monitoring server 110 performs anomaly detection once.

Still with reference to the scenario shown in FIG. 5, both the detection interval and the sampling interval are 1 minute, the server device 120 performs data collection once every 1 minute, and the monitoring server 110 performs anomaly detection once every 1 minute. Specifically, the server device 120 sends the collected time series data within 1 minute to the monitoring server 110, and the monitoring server 110 performs anomaly detection once based on the time series data within the 1 minute. The 1 minute is a to-be-detected time period. It is assumed that the monitoring server receives the time series data within 1:29 to 1:30, and 1:29 to 1:30 is a to-be-detected time period for current anomaly detection.

Specifically, the monitoring server 110 obtains a plurality of data slices based on the to-be-detected time period. The plurality of data slices may be divided into a fresh slice and a historical slice based on whether a time period corresponding to the data slice includes the to-be-detected time period. A time period corresponding to the fresh slice includes the to-be-detected time period; and the historical slice includes a historical same-period slice of the fresh slice.

Figure 6:
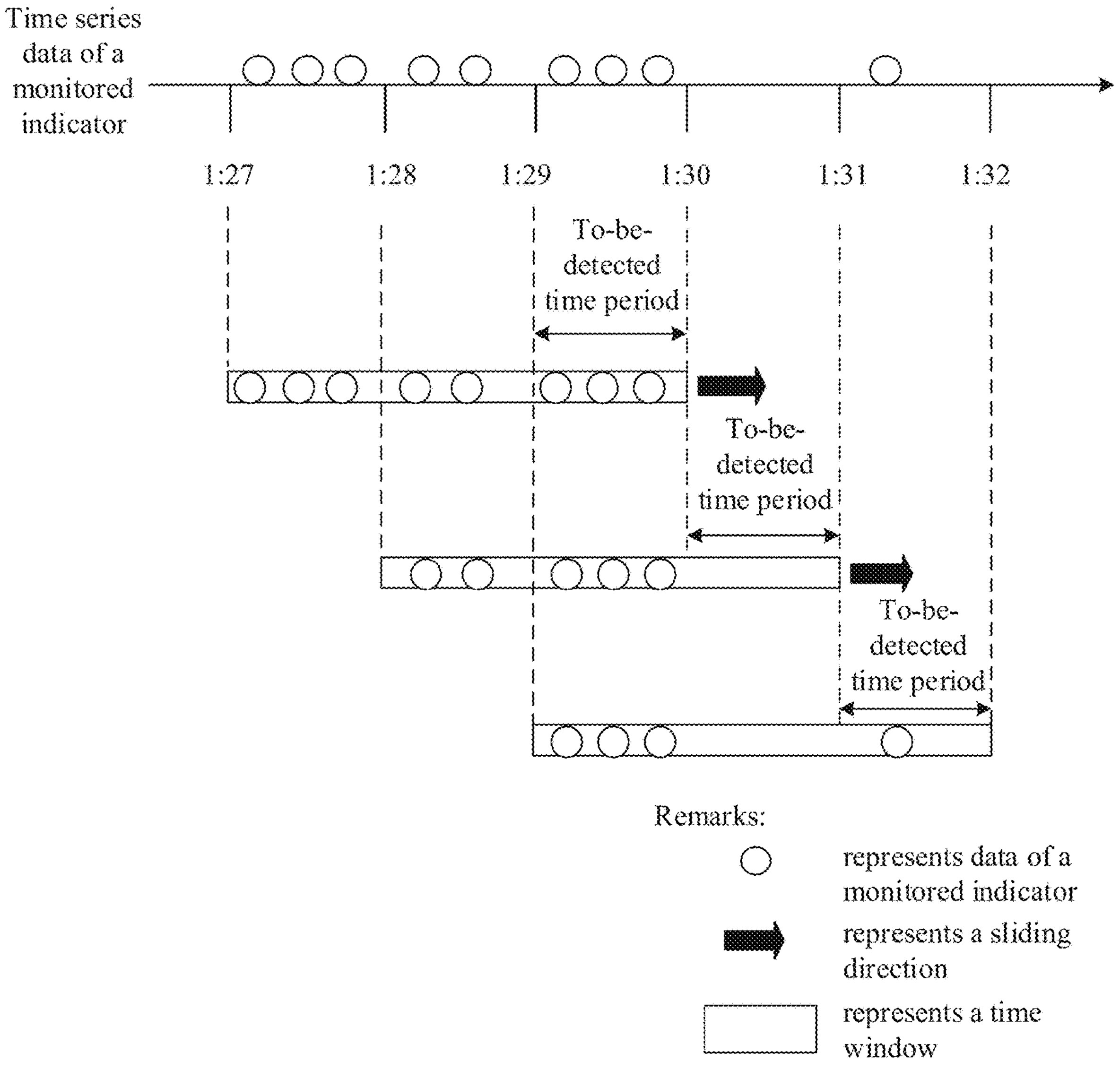
FIG. 6 is a schematic diagram of a sliding manner of a data slice according to an embodiment of this application.

In this application, the fresh slice is a time window with a preset length, and is obtained by sliding on a time series data column of the monitored indicator based on a specified step. After the sliding ends, a right boundary (an end time point) of each fresh slice in the plurality of data slices overlaps a right boundary (an end time point) of the to-be-detected time period. The time series data column includes time series data of the monitored indicator in a time period range, and includes historical time series data and to-be-detected time series data, where the historical time series data may be obtained from the database. As shown in FIG. 6, it is assumed that a length of a time window corresponding to one fresh slice is 3 minutes. For the to-be-detected time period 1:29 to 1:30, a time period corresponding to the fresh slice is 1:27 to 1:30, to be specific, a start time point of the fresh slice is 1:27, and an end time point of the fresh slice is 1:30. If the to-be-detected time period is 1:30 to 1:31, the time window slides forward until a right boundary of the time window overlaps a right boundary of the to-be-detected time period, to obtain one fresh slice 1:28 to 1:31 corresponding to the to-be-detected time period 1:30 to 1:31. It may be learned that a step of each sliding performed by the time window is 1 minute. After the sliding ends, the right boundary of the fresh slice overlaps the right boundary of the to-be-detected time period.

It should be noted that the length of the time window may be a time length, or may be measured by using another unit. For example, if a quantity of aggregation points is, for example, one aggregation point in 1 minute, and 60 aggregation points are included in 1 hour, the length of the time window may be 1 hour, or may be 60 aggregation points. For another example, if there is one aggregation point in 5 minutes and 12 aggregation points in 1 hour, the length of the time window may be 1 hour, or may be 12 aggregation points. In addition, lengths of the foregoing time windows are merely examples. A longer length of the time window indicates that a data slice may more reflect a fluctuation mode of the monitored indicator, but requires higher calculation overheads. A preset length of the time window may be set based on an empirical value, or may be determined based on another manner, for example, an aggregation granularity. This is not limited in this application.

In this application, for one time of anomaly detection, there may be a plurality of fresh slices, and different fresh slices have different lengths, to be specific, preset lengths of time windows corresponding to the fresh slices are different. For example, there are three fresh slices, and slice lengths are respectively as follows: 3 minutes, 4 minutes, and 5 minutes. As shown in FIG. 5, a length of a slice 1 is 3 minutes, a length of a slice 2 is 4 minutes, and a length of a slice 3 is 5 minutes. Certainly, the foregoing slice length is merely an example. For example, the length of the slice 1 may be 10 minutes, the length of the slice 2 is 25 minutes, and the length of the slice 3 is 60 minutes. This is not specifically limited.

The historical same-period is a same time period on different dates. A historical same-period slice of the fresh slice is a slice that is in a same time period as the fresh slice and that is on different dates. In other words, a start time point is used as an example. A time interval between a start time point of the fresh slice and a start time point of the historical same-period slice is 24 hours*N, or a time interval between the start time point of the fresh slice and the start time point of the historical same-period slice is N days, where N is a positive integer. A length of the fresh slice is the same as a length of the historical same-period slice of the fresh slice. In this application, a plurality of historical same-period slices may be obtained based on one fresh slice, and an interval between each historical same-period slice and the fresh slice is different in days. For example, in FIG. 5, a historical same-period slice of a slice 1 includes a slice 1' and a slice 1", where time information of the slice 1 is Mar. 9, 2022 1:27 to 1:30, and time information of the slice 1' is Mar. 8, 2022 1:27 to 1:30. In other words, an interval between the slice 1' and the slice 1 is one day. Time information of the slice 1" is: Mar. 2, 2022 1:27 to 1:30. In other words, an interval between the slice 1" and the slice 1 is one week (7 days).

Similarly, a historical same-period slice of a slice 2 includes a slice 2' and a slice 2", where time information of the slice 2 is Mar. 9, 2022 1:26 to 1:30, and time information of the slice 1' is Mar. 8, 2022 1:26 to 1:30. In other words, an interval between the slice 2' and the slice 2 is one day. Time information of the slice 2" is: Mar. 2, 2022 1:26 to 1:30. In other words, an interval between the slice 2" and the slice 2 is 7 days.

The historical same-period slice of the slice 3 includes a slice 3' and a slice 3", where time information of the slice 3 is Mar. 9, 2022 1:25 to 1:30, and time information of the slice 3' is Mar. 8, 2022 1:25 to 1:30. In other words, an interval between the slice 3' and the slice 3 is one day. Time information of the slice 3" is: Mar. 2, 2022 1:25 to 1:30. In other words, an interval between the slice 3" and the slice 3 is 7 days.

Based on the foregoing design, N may be a plurality of positive integers. When N is 1, a fluctuation mode of the monitored indicator one day ago may be reflected based on a historical same-period slice one day ago. When N is 7 days, a fluctuation mode of the monitored indicator one week ago may be reflected based on a historical same-period slice one week ago. Similarly, a fluctuation mode of the monitored indicator one month ago may be reflected based on a historical same-period slice one month ago, which helps detect various periodic (a day, a week, a month, and the like) anomalies. A value of N may be set with reference to an anomaly detection model, and is described below.

It should be noted that a value of N also belongs to a parameter of the anomaly detection algorithm, and may be a default value, or may be set on a side of the monitoring server 110. A preset value may be set, or a plurality of preset values may be set. As shown in FIG. 5, the plurality of preset values include 1 day and 7 days, and N is set to 1 and 7 respectively. Alternatively, a monitoring policy may be set by a user on a monitoring policy configuration page. Similarly, a quantity of fresh slices and a length of each fresh slice may also be set by the user, and details are not described herein again. Alternatively, an algorithm parameter may also be forbidden to be set by the user, but may be displayed to the user for viewing. In summary, FIG. 5 is used as an example for description. In step 404, the monitoring server 110 obtains a plurality of data slices corresponding to the to-be-detected time period (2022.03.09 1:29 to 1:30), where the plurality of data slices include: the fresh slice (the slice 1, the slice 2, and the slice 3) and the historical same-period slice (the slice 1', the slice 1", the slice 2', the slice 2", the slice 3, and the slice 3") respectively corresponding to each fresh slice.

It should be noted that data (which may be referred to as slice data for short) included in a data slice is preprocessed data. For example, using aggregation as an example, in FIG. 5, slice 1 data includes: data (denoted as y0) obtained after time series data within 1:29 to 1:30 is aggregated; slice 2 data includes: y0, data (denoted as y1) obtained after time series data within 1:28 to 1:29 is aggregated, and data (denoted as y2) obtained after time series data within 1:27 to 1:28 is aggregated; and slice 3 data includes: y0, y1, y2, data (denoted as y3) obtained after time series data within 1:26 to 1:27 is aggregated, and data (denoted as y4) obtained after time series data within 1:25 to 1:26 is aggregated. y1 is a previous piece of data of y0, y1 and y2 are the first two pieces of data of y0, y1, y2, and y3 are the first three pieces of data of y0, and the reset can be deduced by analogy.

In an implementation, when step 403 is performed, the monitoring server 110 obtains historical time series data (for example, y4, y3, y2, y1, slice 1' data, slice 1" data, slice 2' data, slice 2" data, slice 3' data, and slice 3" data) of the monitored indicator from a database (for example, a hard disk 115) to a memory 113. In another implementation, before performing step 404, the monitoring server 110 may read the part of historical time series data from the database into the memory 113 in advance, to reduce waiting duration for performing a reading operation during anomaly detection. This improves efficiency of anomaly detection. Data (for example, y0) in the to-be-detected time period may be stored in the memory 113 after the monitoring server 110 obtains the data through preprocessing, to reduce an amount of data that needs to be read.

Step 405: The monitoring server 110 extracts a plurality of features based on the plurality of data slices.

In this application, for current anomaly detection, the monitoring server 110 extracts the plurality of features, including but not limited to a time feature, a difference feature, a sequence feature, and a statistical feature. Details are respectively as follows:

1. Time feature: represents a feature value of the monitored indicator in a to-be-detected time period in a time dimension.

For example, the time feature includes but is not limited to one or more of the following: an average value of data in the to-be-detected time period and an average value of data in a historical same-period time period.

In a scenario shown in FIG. 5, the average value of the data in the to-be-detected time period is an aggregated value y0 (current_time_duration), and the average value of the data in the historical same-period time period of the to-be-detected time period is, for example, y0' (last_day_duration), and y0" (last_week_duration).

It should be noted that the average value is used as the feature value. In this application, another value may be used as the feature value, for example, a value that appears most frequently in the to-be-detected time period, or a value that meets another preset algorithm. This is not limited in embodiments of this application.

2. Difference feature: a difference between the data in the to-be-detected time period and data in another time period.

For example, the difference feature includes but is not limited to one or more of the following: a difference between data (for example, y0) in the to-be-detected time period and data (for example, y1) of first m points, and a difference between the data in the to-be-detected time period and the data in the historical same-period time period.

In the scenario shown in FIG. 5, the difference feature includes: y0-y1 (last_current_diff), and the difference between the data in the to-be-detected time period and the data in the historical same-period time period: y0-y0'(last_day_diff), and y0-y0"(last_week_diff).

3. Sequence feature: a feature value of time series data of the monitored indicator in a period of time (for example, a fresh slice). The sequence feature may also be understood as a feature of a data slice.

For example, the sequence feature includes but is not limited to one or more of the following: an average value of the data in the data slice, a standard deviation of the data in the data slice, and an exponential weighted moving average (ewma) value of the data in the data slice.

In the scenario shown in FIG. 5, the sequence feature includes: an average value $$\left(\text{MA\_N1: } \frac{y0 + y1 + y2}{3}\right)$$

of data in a slice 1, an average value $$\left(\text{MA\_N2: } \frac{y0 + y1 + y2 + y3}{4}\right)$$

of data in a slice 2, an average value $$\left(\text{MA\_N3: } \frac{y0 + y1 + y2 + y3 + y4}{5}\right)$$

of data in a slice 3; and a standard deviation of the data in the slice 1, a standard deviation of the data in the slice 2, a standard deviation of the data in the slice 3, an exponential weighted moving average value (ewma_N1) of the data in the slice 1, an exponential weighted moving average value (ewma_N2) of the data in the slice 2, and an exponential weighted moving average value (ewma_N3) of the data in the slice 3. A formula for calculating the standard deviation is not described herein again.

The exponential weighted moving average value may be determined based on a weight and the data in the data slice. For example, the exponential weighted moving average value satisfies Formula 1 and Formula 2:

$$S_1 = Y_1, \text{ and } t = 1 \quad \text{Formula 1}$$

$$S_t = \alpha * Y_t + (1 - \alpha) S_{t-1}, \text{ and } t > 1 \quad \text{Formula 2}$$

α represents a weight, and α may be any value less than 1, for example, 0.1, 0.3, 0.5, 0.7, or 0.9.

$Y_t$ represents a $t^{th}$ point in the data slice. For example, in the slice 1 (y0, y1, and y2), the first point is y0, the second point is y1, and the third point is y2. For another example, in the slice 2 (y0, y1, y2, and y3), the first point is y0, the second point is y1, the third point is y2, and the fourth point is y3. For another example, in the slice 3 (y0, y1, y2, y3, and y4), the first point is y0, the second point is y1, the third point is y2, the fourth point is y3, and the fifth point is y4.

$S_t$ represents an exponential weighted moving average value of the $t^{th}$ point in the data slice. It should be noted that one $S_t$ is one feature.

For example, it is assumed that α is 0.3, y0=10, y1=9, y2=10, y3=12, and y4=8 in FIG. 5; and (1) a process of calculating the ewma_N1 of the slice 1 is as follows:

$$S1 = y0 = 10;$$

$$S2 = \alpha * y1 + (1 - \alpha)$$

$$S1 = 0.3 * 9 + 0.7 * 10 = 9.7;$$

$$S3 = \alpha * y2 + (1 - \alpha)$$

$$S2 = 0.3 * 10 + 0.7 * 9.7 = 9.79;$$

and the ewma_N1 of the slice 1 includes 10, 9.7, and 9.79.

(2) a process of calculating the ewma_N2 of the slice 2 is as follows:

$$S_1 = y0 = 10;$$

$$S_2 = \alpha * y1 + (1 - \alpha)$$

$$S_1 = 0.3 * 9 + 0.7 * 10 = 9.7;$$

$$S_3 = \alpha * y2 + (1 - \alpha)$$

$$S_2 = 0.3 * 10 + 0.7 * 9.7 = 9.79;$$

$$S_4 = \alpha * y3 + (1 - \alpha)$$

$$S_3 = 0.3 * 12 + 0.7 * 9.79 = 10.45;$$

and the ewma_N2 of the slice 2 includes: 10, 9.7, 9.79, and 10.4.

(3) a process of calculating the ewma_N3 of the slice 3 is as follows:

$$S_1 = y0 = 10;$$

$$S_2 = \alpha * y1 + (1 - \alpha)$$

$$S_1 = 0.3 * 9 + 0.7 * 10 = 9.7;$$

$$S_3 = \alpha * y2 + (1 - \alpha)$$

$$S_2 = 0.3 * 10 + 0.7 * 9.7 = 9.79;$$

$$S_4 = \alpha * y3 + (1 - \alpha)$$

$$S_3 = 0.3 * 12 + 0.7 * 9.79 = 10.45;$$

and $$S_5 = \alpha * y4 + (1 - \alpha)$$

$$S_4 = 0.3 * 8 + 0.7 * 10.45 = 9.72.$$

The ewma_N3 of the slice 3 includes: 10, 9.7, 9.79, 10.4, and 9.72. 10 is one feature, 9.7 is one feature, 9.79 is one feature, 10.4 is one feature, and 9.72 is one feature, to be specific, each $S_t$ is one feature.

It may be learned that a value of α affects a sequence feature (an ewma value) of the data slice, and when α is set to different values, ewma of the data slice may be different. In this application, α may be set to a plurality of values, so that a plurality of groups of ewma values may be obtained based on a same data slice. For example, α is set to 0.3 and 0.5 respectively. In this way, when α=0.3, an ewma value of each data slice may be obtained; and when α=0.5, an ewma value of each data slice may be obtained. It should be noted that for a same value of α, same ewma values in different data slices do not need to be repeatedly calculated. For example, only the ewma_N3 of the slice 3 may be calculated, and then one ewma value at the end is subtracted in sequence, to obtain the ewma_N2 of the slice 2 and the ewma_N1 of the slice 1 in sequence.

It should be noted that an average value, a standard deviation, and an exponential weighted moving average (ewma) value are used as the feature value of the data slice. In this application, another value may also be used as the feature value of the data slice. This is not limited in embodiments of this application.

4. Statistical features: distribution features of monitored indicators in different spaces. In this application, different spaces refer to different time periods on a same date, for example, the to-be-detected time period (for example, 1:29 to 1:30) and a time period (for example, 1:28 to 1:29, 1:26 to 1:27, or 00:28 to 00:29) before the to-be-detected time period. Alternatively, different spaces may refer to a same time period of different dates, for example, a fresh slice and a historical same-period slice of the fresh slice.

For example, the statistical features include but are not limited to one or more of the following: a difference average value of adjacent points in the fresh slice, and a moving difference average value of points at a same location in the fresh slice and the historical same-period slice of the fresh slice.

For example, in the scenario shown in FIG. 5, the statistical features include: a difference average value (last_diff_ma_N1) of the slice 1, a difference average value (last_diff_ma_N2) of the slice 2, and a difference average value (last_diff_ma_N3) of the slice 3.

$$\text{last\_diff\_ma\_N1} = [(y0 - y1) + (y1 - y2)]/2;$$

$$\text{last\_diff\_ma\_N2} = [(y0 - y1) + (y1 - y2) + (y2 - y3)]/3;$$

and $$\text{last\_diff\_ma\_N3} = [(y0 - y1) + (y1 - y2) + (y2 - y3) + (y3 - y4)]/4.$$

The statistical features further include: a moving difference average value (last_diff_ma_N1') between the slice 1 and the slice 1', a moving difference average value (last_diff_ma_N2') between the slice 2 and the slice 2', and a moving difference average value (last_diff_ma_N3') between the slice 3 and the slice 3'.

$$\text{last\_diff\_ma\_N1}' = [(y0 - y0') + (y1 - y1') + (y2 - y2')]/3;$$

$$\text{last\_diff\_ma\_N2}' = [(y0 - y0') + (y1 - y1') + (y2 - y2') + (y3 - y3')]/4;$$

and $$\text{last\_diff\_ma\_N3}' = [(y0 - y0') + (y1 - y1') + (y2 - y2') + (y3 - y3') + (y4 - y4')]/5.$$

Similarly, the statistical features further include: a difference average value (last_diff_ma_N1") between the slice 1 and the slice 1", a difference average value (last_diff_ma_N2") between the slice 1 and the slice 2", and a difference average value (last_diff_ma_N3") from the slice 3".

$$\text{last\_diff\_ma\_N1}'' = [(y0 - y0'') + (y1 - y1'') + (y2 - y2'')]/3;$$

$$\text{last\_diff\_ma\_N2}'' = [(y0 - y0'') + (y1 - y1'') + (y2 - y2'') + (y3 - y3'')]/4;$$

and $$\text{last\_diff\_ma\_N3}'' = [(y0 - y0'') + (y1 - y1'') + (y2 - y2'') + (y3 - y3'') + (y4 - y4'')]/5.$$

Table 1 shows an example of calculating last_diff_ma_N3".

TABLE 1

| Date | Time | Response duration | last_week_diff | last_diff_ma_N3" |
|---|---|---|---|---|
| Mar. 2, 2022 | 1:26 | 15 | | |
| | 1:27 | 16 | | |
| | 1:28 | 8 | | |
| | 1:29 | 10 | | |
| | 1:30 | 9 | | |
| Mar. 9, 2022 | 1:26 | 8 | 8 −15 = −7 | (−7 + (−4) + 2 + |
| | 1:27 | 12 | 12 − 16 = −4 | (−1) + 1)/5 = −1.8 |
| | 1:28 | 10 | 10 − 8 = 2 | |
| | 1:29 | 9 | 9 − 10 = −1 | |
| | 1:30 | 10 | 10 − 9 = 1 | |

In embodiments of this application, a change mode of the monitored indicator is reflected based on the data slice in the to-be-detected time period, a plurality of features are extracted based on the data slice, and the plurality of features are used as input data of the anomaly detection model. In this way, data of a historical slice learned by the anomaly detection model is continuously updated with an update of the to-be-detected time period, and a new anomaly mode is also continuously learned by the model with the update of the to-be-detected time period. This helps improve accuracy and adaptability of the anomaly detection model. It may be understood in this way: If the data slice changes, a feature of the data slice changes to some extent. For a stable application or service, a feature of the data of the historical slice does not change greatly in a short period of time. However, for an application or a service that is unstable, the method may prevent the monitored indicator from being detected as abnormal after a sudden change. Because the data of the historical slice may also have a similar abrupt change, and a feature of the data of the historical slice learned by the anomaly detection model is updated with the update of the to-be-detected time period, the method may avoid continuous alarms after an abrupt change of the monitored indicator.

Step 406: The monitoring server 110 groups a plurality of features into a plurality of feature groups.

For example, a division rule may be that the plurality of features are arranged and combined to obtain the plurality of feature groups. For another example, one feature group includes several fixed features and several randomly selected features. One of the feature groups includes all or a part of all features, and at least one feature in different feature groups is different. FIG. 7 is a schematic diagram of a division manner of some feature groups according to an embodiment of this application. As shown in FIG. 7, nine feature groups may be obtained based on a combination manner shown in FIG. 7.

Step 407: The monitoring server 110 respectively inputs the plurality of feature groups into a plurality of anomaly detection models, to obtain detection results respectively output by the plurality of anomaly detection models.

Each feature group is input data of one or more anomaly detection models, and feature groups input into different anomaly detection models are different. Each anomaly detection model obtains one detection result based on the input feature group, and the detection result indicates that the anomaly detection mode infers whether the monitored indicator is abnormal.

In this application, algorithms of the plurality of anomaly detection models may be completely different. For example, the algorithms of the plurality of anomaly detection models are respectively all or a part of algorithms such as a one-class support vector machine (one-class SVM), an outlier detection algorithm (Local outlier factor), an isolation forest, 3-Sigma (3a, also referred to as a Lajida criterion), a box-plot (box diagram), time series decomposition STL, and a variation auto-encoder (VAE). This is merely an example, and the algorithm of the anomaly detection model is not limited in this application. Alternatively, the algorithms of the plurality of anomaly detection models may not be completely the same, and parameter values or input data of the algorithms in some anomaly detection models with the same algorithm may be different. This is described below.

Based on the foregoing design, the plurality of anomaly detection models in embodiments of this application may be deployed as all or a part models that may detect a plurality of common anomaly features, for example, a model used to detect a periodic anomaly (a minute, an hour, a day, a week, or a month), a model used to detect a seasonal anomaly, a model used to detect a trend anomaly, and a model used to detect an abrupt change anomaly in a holiday. In this way, anomalies of monitored indicators in a plurality of different fluctuation modes may be simultaneously detected, and a plurality of systems or monitored indicators may be applied. If the anomaly detection model includes a daily anomaly model, a time interval between the fresh slice and the historical same-period slice of the fresh slice may be 1 day, to be specific, a preset value of N is 1 day. If the anomaly detection model includes a weekly anomaly model, a time interval between the fresh slice and the historical same-period slice of the fresh slice may be 7 days, to be specific, a preset value of N is 7 days. If the anomaly detection model includes a monthly anomaly model, a time interval between the fresh slice and the historical same-period slice of the fresh slice may be 1 month, to be specific, a preset value of N is 30 days (or 31 days, or the like).

Further, this application may further include a plurality of anomaly detection models used to detect a same type of anomaly, and input data or algorithm parameters of different models in the same type of anomaly detection model are different.

For example, in this application, coarse granularities of the plurality of anomaly detection models are divided into two types of anomaly detection models based on algorithms. An algorithm of one type of anomaly detection model is an isolation forest, and an algorithm of the other type of anomaly detection model is a statistical algorithm. In each type of anomaly detection model, a plurality of anomaly detection models with different input data or different algorithm parameter values are further divided at a fine granularity. For example, FIG. 7 shows a first type of anomaly detection model. Algorithms of a model 1 to a model 9 are isolation forests, but input data (namely, input feature groups) of the model 1 to the model 9 are different from each other.

Figure 8:
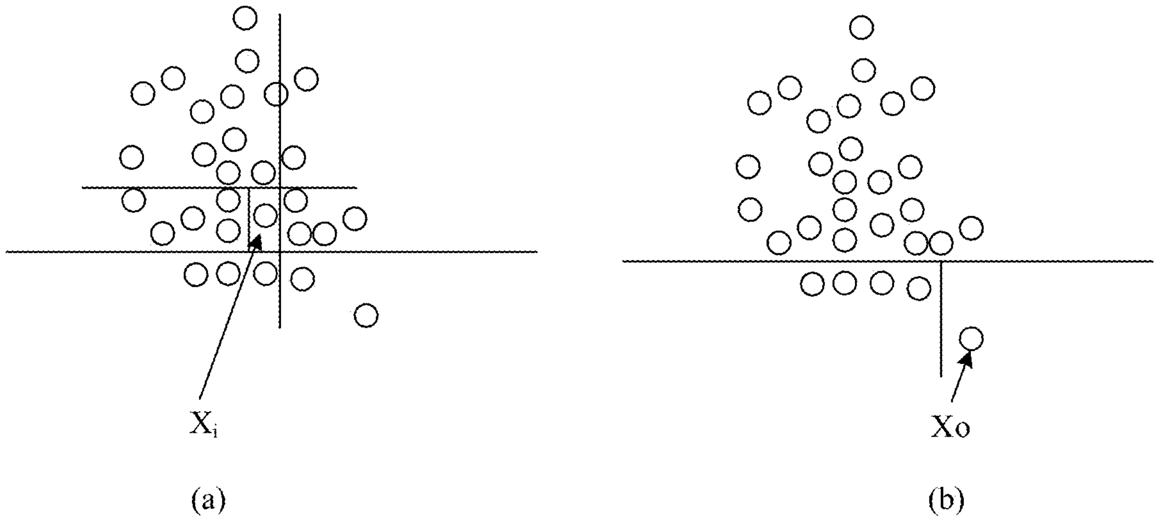
FIG. 8 is a schematic diagram of application of an isolation forest.

Using the isolation forest as an example, the anomaly detection model is obtained by training a machine learning algorithm (such as the isolation forest). During training, there is no need to perform training by using labeled samples, but some features are randomly selected and are randomly cut. The more likely to be separated (more likely to be separated) points, namely, points that are sparsely distributed and are far away from the densely populated population, are used as abnormal points. In a feature space, a sparsely distributed area represents that a probability that an event occurs in the area is low. Therefore, data in these areas may be considered abnormal. Refer to (a) and (b) in FIG. 8. A normal point xi needs to be segmented for a large quantity of times to be isolated, and an abnormal point xo needs to be segmented for a small quantity of times to be isolated. Certainly, FIG. 8 is merely an example. FIG. 8 shows a two-dimensional coordinate system. A quantity of dimensions of a coordinate system applied to an isolation forest is not limited in this application.

In this application, a single feature in a same feature group may be considered as one dimension of a multidimensional space, and a plurality of features in a same feature group jointly form different dimensions of the multidimensional space. After the feature group is input into the anomaly detection model, the anomaly detection model projects the plurality of features into a same coordinate system, and then randomly selects one feature space and one dimension for one or more times of cutting. A quantity of cutting times may be preset. If at least one of the plurality of features in the feature group is isolated, it is considered that the monitored indicator is abnormal. To improve reliability, the anomaly detection model may perform a plurality of rounds of cross-check. If it is detected that the monitored indicator is abnormal in most cases, it is considered that the monitored indicator is abnormal. For example, the anomaly detection model performs 10 times (or another preset value) of cross-check. If a detection result obtained five or more times (or another preset value) considers that the monitored indicator is abnormal, the anomaly detection model considers that the monitored indicator is abnormal, and the anomaly detection model outputs a detection result indicating that the monitored indicator is abnormal. If the anomaly detection model considers that the monitored indicator is not abnormal, the anomaly detection model outputs a detection result indicating that the monitored indicator is not abnormal. The model 1 to the model 9 respectively output respective detection results based on the foregoing method.

It should be noted that for ease of description, FIG. 7 shows only some anomaly detection models. A quantity of anomaly detection models is not limited in this application.

The following describes the second type of anomaly detection model.

It is assumed that the second type of anomaly detection model includes a model 10 to a model 24 (not shown in FIG. 7). For example, algorithms of the model 10 to the model 24 are all statistical algorithms. For example, the statistical algorithm is inferring a fluctuation peak of a data slice based on an average value of the data slice and a standard deviation of the data slice. If data in the data slice exceeds the fluctuation peak, it is determined that the monitored indicator is abnormal; or if data in the data slice does not exceed the fluctuation peak, it is determined that the monitored indicator is not abnormal.

It is assumed that the statistical algorithm includes Formula 3:

Formula 3

$$\text{Fluctuation peak of the monitored indicator} = \text{Average value of the fresh slice} + h(\beta) * \text{Standard deviation of the fresh slice}$$

Using one of the anomaly detection models (for example, the model 10) as an example, it is assumed that the fresh slice is the slice 1, and input data of the model 10 is an average value of the slice 1 and a standard deviation of the slice 1. The model 10 calculates a fluctuation peak of the slice 1 based on the foregoing statistical algorithm, the average value of the slice 1, and the standard deviation of the slice 1. If data in the slice 1 exceeds the fluctuation peak, it is considered that the monitored indicator is abnormal, and the model 10 outputs a detection result indicating that the monitored indicator is abnormal. If the data in the slice 1 does not exceed the fluctuation peak, it is considered that the monitored indicator is not abnormal, and the model 10 outputs a detection result indicating that the monitored indicator is not abnormal.

When β is set to be different values, h (β) is also set to be different values. Correspondingly, the calculated fluctuation peaks are also different. Table 2 is an example of an anomaly detection model according to an embodiment of this application. In an implementation, β is any value less than 1. It should be understood that a value of β in Table 2 is merely an example. β may alternatively be set to be another value. Alternatively, more anomaly detection models are set, so that β is set to be more values. This is not limited in this application.

TABLE 2

| Data slice | Anomaly detection model | Value β |
|---|---|---|
| Slice 1 | Model 10 | 0.1 |
| | Model 11 | 0.3 |
| | Model 12 | 0.5 |
| | Model 13 | 0.7 |
| | Model 14 | 0.9 |
| Slice 2 | Model 15 | 0.1 |
| | Model 16 | 0.3 |
| | Model 17 | 0.5 |
| | Model 18 | 0.7 |
| | Model 19 | 0.9 |
| Slice 3 | Model 20 | 0.1 |
| | Model 21 | 0.3 |
| | Model 22 | 0.5 |
| | Model 23 | 0.7 |
| | Model 24 | 0.9 |

With reference to Table 2, it is assumed that the model 10 to the model 24 all use the algorithm of Formula 3. Input data of the model 10 to input data of the model 14 are the same, and are an average value of the slice 1 and a standard deviation of the slice 1. Values of β in the model 10 to the model 14 may be 0.1, 0.3, 0.5, 0.7, and 0.9, to be specific, β of the model 10 is equal to 0.1, β of the model 11 is equal to 0.3, β of the model 12 is equal to 0.5, β of the model 13 is equal to 0.7, and β of the model 14 is equal to 0.9. Similarly, input data of the model 15 to input data of the model 19 are an average value of the slice 2 and a standard deviation of the slice 2, and values of 3 in the model 15 to the model 19 may be 0.1, 0.3, 0.5, 0.7, and 0.9 respectively. Input data of the model 20 to input data of the model 24 are an average value of the slice 3 and a standard deviation of the slice 3, and values of 3 in the model 20 to the model 24 may be 0.1, 0.3, 0.5, 0.7, and 0.9 respectively. The model 10 to the model 24 respectively output respective detection result in the foregoing manner.

In the foregoing design, in this application, an unsupervised algorithm may be used for the anomaly detection model in this application. In this way, operation and management personnel do not need to provide a labeled sample (for example, an abnormal sample), and do not need to perform offline training by using the abnormal sample. Because it is difficult to obtain the abnormal sample and the abnormal sample is variable, the method may reduce a burden of the operation and management personnel. In addition, different unsupervised algorithms may be further used for the plurality of anomaly detection models, so that a problem of algorithm selection difficulty may be resolved. In addition, when the plurality of anomaly detection models use a same unsupervised algorithm, parameters in algorithms of the different anomaly detection models may have different values, and an effect of automatic parameter adjustment is implemented through grid parameter setting, without a need to adjust a complex parameter. Time series data of the monitored indicator sent by the server device 120 is accessed. This achieves high usability.

Step 408: The monitoring server 110 determines, based on detection results output by the plurality of anomaly detection models, whether the monitored indicator is abnormal; and performs step 409 if the monitored indicator is abnormal, or the current anomaly detection process exits if the monitored indicator is not abnormal.

For example, in the scenario shown in FIG. 7, the model 1 to the model 24 respectively output the detection result. For ease of description, a detection result of a model x is denoted as a detection result x. For example, a detection result of the model 1 is denoted as a detection result 1. If a quantity of detection results indicating that the monitored indicator is abnormal in all detection results (the detection result 1 to a detection result 24) exceeds a preset threshold (denoted as a first preset threshold), it is determined that the monitored indicator is abnormal; or if a quantity of detection results indicating that the monitored indicator is abnormal in all detection results does not exceed a preset threshold, it is determined that the detection object is not abnormal. For example, the first preset threshold is 50%. When 50% or more of the anomaly detection results in all the anomaly detection results indicate that the monitored indicator is abnormal, it is finally determined that the monitored indicator is abnormal. It may also be understood that all the anomaly detection models vote, and if half or more of the anomaly detection models consider that the monitored indicator is abnormal, it is determined that the monitored indicator is abnormal. For another example, the first preset threshold is 90%. When more than 90% of all anomaly detection models consider that the monitored indicator is abnormal, it is determined that the monitored indicator is abnormal. Similarly, the first preset threshold may be set on a side of the monitoring server 110, or may be set by the user.

Step 409: The monitoring server 110 notifies the server device 120 that the monitored indicator is abnormal.

For example, the monitoring server 110 sends a notification to the server device 120 based on an alarm policy. For example, when the alarm policy is that the monitored indicator is detected to be abnormal, the monitoring server 110 sends a notification to the server device 120. Alternatively, when the alarm policy is a plurality of consecutive detection results or that a quantity of times that the monitored indicator is detected to be abnormal in a period of time reaches a preset threshold (denoted as a second preset threshold), the monitoring server sends a notification to the server device 120, and notifies that the monitored indicator is abnormal. For another example, a notification manner may be that the monitoring server 110 sends, to the server device 120, a detection result indicating that the monitored indicator is abnormal. It should be noted that the monitoring server 110 may also send another message to notify the server device 120. This is not specifically limited.

Step 410: The server device 120 makes an alarm.

It should be understood that when the server device 120 does not receive the notification (for example, the detection result), it may be considered that the monitored indicator is not abnormal. Certainly, regardless of whether the monitored indicator is abnormal, the monitoring server 110 may send the detection result to the server device 120. The server device 120 makes the alarm when determining, based on the detection result, that the monitored indicator is abnormal.

In an optional implementation, the server device 120 feeds back accuracy of the detection result. For example, the monitoring server 110 notifies the server device 120 that a monitored indicator in a time period is abnormal. However, actually, the monitored indicator is not abnormal in the time period, and it is determined that the detection result is incorrect. The server device 120 reports an error report, where the error report indicates that the detection result sent by the monitoring server 110 is inaccurate, for example, the monitored indicator is not abnormal in a time period, or the monitored indicator is abnormal in a time period. For example, the server device 120 may feed back an error report on a specified platform (for example, a purchasing platform), and the monitoring server 110 obtains the error report fed back by the user, and triggers model retraining with reference to a condition such as running duration of the anomaly detection model. For example, when the running duration of the anomaly detection model reaches preset duration, model retraining is triggered. It should be understood that for an anomaly detection model of an unsupervised algorithm, model training does not need to be performed by using a labeled sample (for example, an anomaly sample). Instead, during retraining, a plurality of features of a data slice in a corresponding time period are obtained based on the error report fed back by the user, the plurality of features are input into the anomaly detection model as sample data, and algorithm parameters (for example, values such as a and p in the foregoing example) in the anomaly detection model are adjusted. When a detection result output by the anomaly detection model meets a result fed back by the user, training is stopped. For example, if the user feeds back that a monitored indicator in a time period is not abnormal, the model parameter is adjusted, until the detection result indicates that the monitored indicator in the period is not abnormal. For another example, if the user feeds back that the monitored indicator is abnormal in a time period, the model parameter is adjusted until the detection result indicates that the monitored indicator in the time period is abnormal. In this way, iterative optimization of algorithm parameters is implemented. A condition for stopping training may further include another condition, for example, setting with reference to training duration, a detection error, and the like. This is not specifically limited.

It should be noted that the monitoring service is an implementation of the system monitoring method provided in embodiments of this application. In embodiments of this application, a function implemented by the monitoring server 110 by performing the system monitoring method provided in embodiments of this application may be alternatively implemented by a software module, a hardware module, or a software module and a hardware model. For example, when the function is implemented by the software module, a user may install the software module in user equipment, or when the function is implemented by the hardware model and the software model, the user may deploy the hardware module in the user equipment, or deploy the software module and the hardware model, to perform a function of the monitoring server 110 in embodiments of this application, and monitor a monitored indicator in the IT system 20.

Based on the foregoing design, the monitoring server 110 extracts a plurality of features based on a plurality of data slices corresponding to a to-be-detected time period, where data of one data slice includes data in the to-be-detected time period. The monitoring server 110 groups the plurality of features into a plurality of feature groups, and separately uses the plurality of feature groups as the input data of the anomaly detection model. One detection result may be output based on one feature group. Each detection result indicates an anomaly detection mode to infer whether the monitored indicator is abnormal. The monitoring server 110 determines, based on the plurality of detection results, whether the monitored indicator is abnormal. In this application, a plurality of detection results may be determined based on the plurality of feature groups, and different feature groups may be used to capture different anomaly modes, so that a plurality of systems or a plurality of monitored indicators can be applied, and whether the monitored indicator is abnormal is determined based on the plurality of detection results. This avoids determining, by using a single algorithm, whether the monitored indicator is abnormal, and may improve accuracy and usability of anomaly detection.

Figure 9:
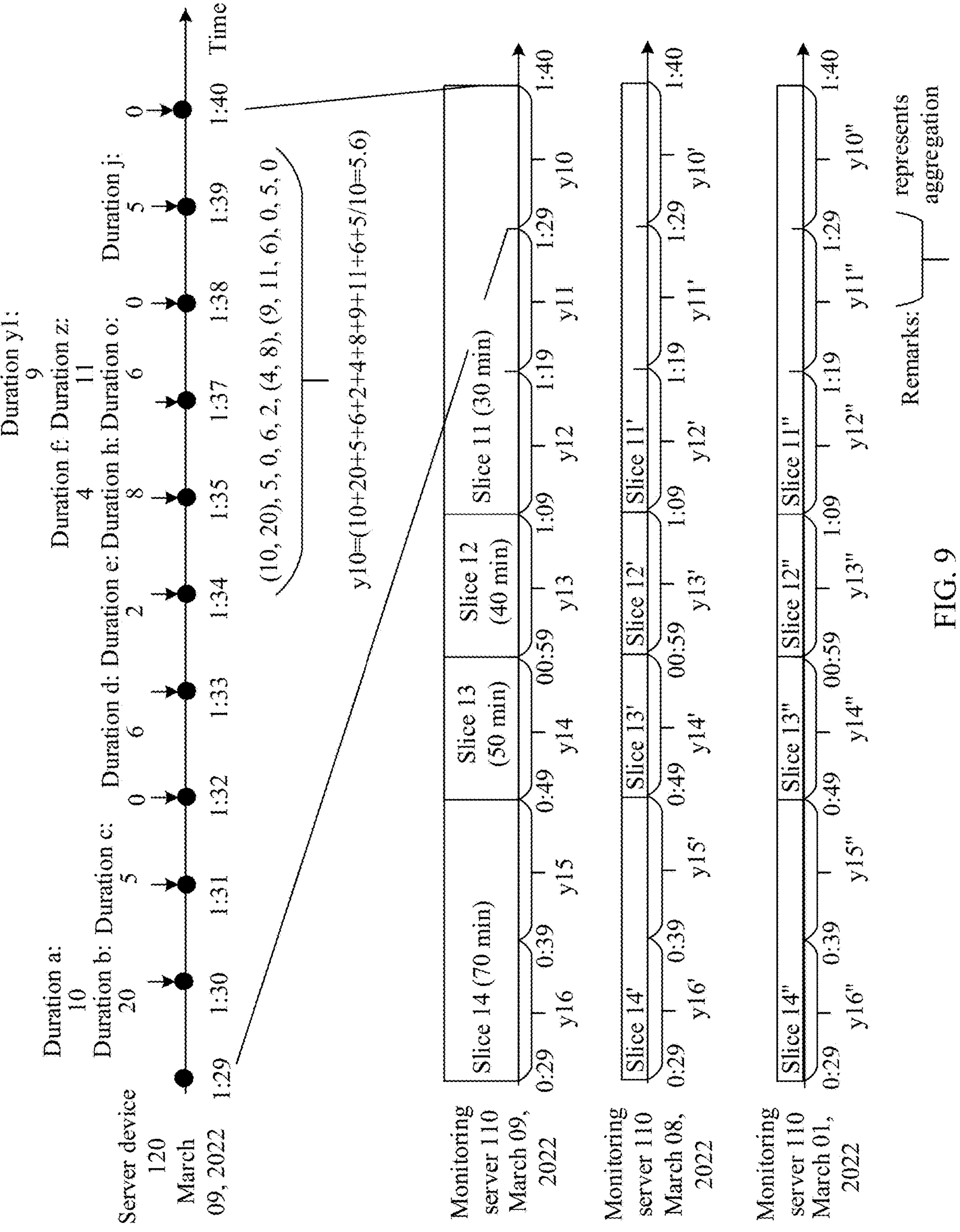
FIG. 9 is a schematic diagram of another system monitoring scenario according to an embodiment of this application.

FIG. 9 is a schematic diagram of another system monitoring scenario according to an embodiment of this application. A difference between FIG. 9 and FIG. 5 includes that a sampling interval is different from a detection interval. The sampling interval is 1 minute, the detection interval is 10 minutes, and the server device 120 collects an access record of the monitored indicator once every 1 minute. For example, two access records in a time period from 1:29 to 1:30 are collected at 1:30, and values of monitored indicators (for example, response duration of an application) recorded in the two access records are respectively 10s and 20s. The server device 120 collects one access record at 1:31, where a recorded monitored indicator is 5s. The server device 120 does not collect an access record at 1:32, to be specific, no user accesses the application in a time period from 1:31 to 1:32. The server device 120 collects one access record at 1:33, where a value of a recorded monitored indicator is 6s, and the reset can be deduced by analogy.

The server device 120 sends the time series data of the monitored indicator to the monitoring server 110. For example, the server device 120 may send the data collected this time each time. For example, the server device 120 sends the time series data in the time period from 1:29 to 1:30 to the monitoring server 110 at 1:30; sends the time series data in the time period from 1:30 to 1:31 to the monitoring server 110 at 1:31; and sends the time series data in the time period from 1:31 to 1:32 to the monitoring server 110 at 1:32, and the reset can be deduced by analogy.

Alternatively, the time series data within the 10 minutes (for example, 1:29 to 1:40) may also be sent to the monitoring server 110. 1:29 to 1:40 is a to-be-detected time period.

The monitoring server 110 preprocesses, for example, aggregates, data in the to-be-detected time period. In the scenario shown in FIG. 9, a time unit of aggregation is 10 minutes. For a specific aggregation manner, refer to the foregoing description. Details are not described herein again. The plurality of data slices in current anomaly detection include a fresh slice (for example, a slice 11, a slice 12, a slice 13, and a slice 14) and a historical same-period slice (for example, a slice 11', a slice 12', a slice 13', a slice 14', a slice 11", a slice 12", a slice 13", and a slice 14") of the fresh slice. Data in the data slice is aggregated data.

The monitoring server 110 extracts a plurality of features based on the plurality of data slices, divides the plurality of features into a plurality of feature combinations, respectively inputs the plurality of feature combinations into a plurality of anomaly detection models, and determines, based on detection results respectively output by the plurality of anomaly detection models, whether the monitored indicator is abnormal. For specific execution steps, refer to the foregoing related descriptions. Details are not described herein again.

Figure 10:
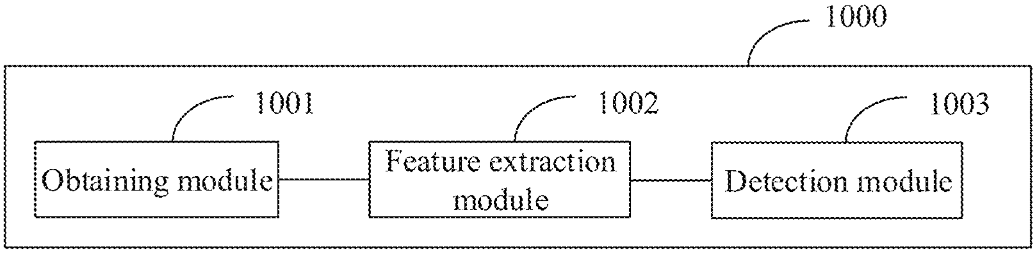
FIG. 10 is a schematic diagram of a structure of a system monitoring apparatus according to an embodiment of this application.

With reference to FIG. 1 to FIG. 9, the system monitoring method provided in this application is described above. Based on a same concept as the method embodiment, embodiments of this application further provide a system monitoring apparatus. The system monitoring apparatus is configured to perform the method performed by the monitoring server 110 in the method embodiment shown in FIG. 4. As shown in FIG. 10, the system monitoring apparatus 1000 includes an obtaining module 1001, a feature extraction module 1002, and a detection module 1003. Specifically, in the system monitoring apparatus 1000, each module directly establishes a connection through a communication channel.

The obtaining module 1001 is configured to obtain time series data of a monitored indicator in a to-be-detected time period; and for a specific implementation, refer to descriptions of step 401 to step 403 in FIG. 4, and details are not described herein again.

The feature extraction module 1002 is configured to extract a plurality of features based on a plurality of data slices corresponding to the to-be-detected time period, where the plurality of data slices include one or more to-be-detected slices, and data of the to-be-detected slice includes the time series data; and for a specific implementation, refer to descriptions of step 404 to step 405 in FIG. 4, and details are not described herein again.

The detection module 1003 is configured to separately use a plurality of feature combinations as input data of an anomaly detection model, and determine, based on a detection result of the plurality of anomaly detection model, whether the monitored indicator is abnormal, where the detection result indicates whether the monitored indicator is abnormal; and one of the feature combinations includes a part or all of the plurality of features. For a specific implementation, refer to descriptions of step 406 to step 408 in FIG. 4, and details are not described herein again.

In a possible implementation, the plurality of features include one or more types of the following features:

a time feature, a difference feature, a sequence feature, and a statistical feature, where the time feature identifies a feature value of the monitored indicator in the to-be-detected time period, the difference feature identifies a feature value of a difference between data of the monitored indicator in the to-be-detected time period and data of the monitored indicator in another time period, the sequence feature identifies a feature value of data in one data slice of the monitored indicator, and the statistical feature identifies a distribution feature of the monitored indicator in different data slices.

In a possible implementation, the to-be-detected slice data further includes historical time series data in a period of time before the to-be-detected time series data; and the time feature includes one or more of the following:

an average value of the to-be-detected time series data; and an average value of historical same-period data of the to-be-detected time series data;

the difference feature includes one or more of the following:

a difference between the to-be-detected time series data and the historical time series data in the to-be-detected slice;

a difference between the to-be-detected time series data and the historical same-period data; and an average value of a difference between data at a same location in the to-be-detected slice and a historical same-period slice of the to-be-detected slice; and the sequence feature includes one or more of the following:

an average value of the data in the to-be-detected slice;

a standard deviation of the data in the to-be-detected slice;

an average value of the data in the historical same-period slice of the to-be-detected slice; and an exponential weighted moving average value of the data in the to-be-detected slice.

In a possible implementation, the plurality of data slices include a plurality of to-be-detected slices, one of the to-be-detected slices is obtained by sliding a time window with one preset length on a time series data column of the monitored indicator based on a specified step; and preset lengths of time windows corresponding to different to-be-detected slices are different.

In a possible implementation, the plurality of data slices further include a historical same-period slice of each of one or more to-be-detected slices; and a time interval between one of the to-be-detected slices and the historical same-period slice of the to-be-detected slice is N days, and N is set to one or more preset positive integers.

In a possible implementation, algorithms of a part or all of the plurality of anomaly detection models are different, or algorithms of a part or all of the plurality of anomaly detection models are the same, but values of parameters in the algorithms are different; and algorithms of the plurality of anomaly detection models include an unsupervised algorithm.

Embodiments of this application further provide a computer storage medium. The computer storage medium stores computer instructions. When the computer instructions are run on a system monitoring apparatus, the system monitoring apparatus performs the foregoing related method steps to implement the method performed by the monitoring server 110 in the foregoing embodiment. Refer to the descriptions of the steps in FIG. 4. Details are not described herein again.

Embodiments of this application further provide a computer program product. When the computer program product is run on a computer, the computer is enabled to perform the foregoing related steps, to implement the method performed by the monitoring server 110 in the foregoing embodiment. For details, refer to the descriptions of the steps in FIG. 4. Details are not described herein again.

In addition, embodiments of this application further provide an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, so that the chip performs the method performed by the monitoring server 110 in the foregoing method embodiments. For details, refer to the descriptions of the steps in FIG. 4. Details are not described herein again.

The system monitoring apparatus, the computer storage medium, the computer program product, or the chip provided in embodiments of this application is configured to perform the method corresponding to the monitoring server 110 provided above. Therefore, for beneficial effects that may be achieved by the system monitoring apparatus, the computer storage medium, the computer program product, or the chip, refer to the beneficial effects in the corresponding method provided above. Details are not described herein again.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid-State Disk, SSD)), or the like.

The various illustrative logical units and circuits in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A system monitoring method comprising:

obtaining, by a monitoring server, time series data of a monitored indicator in a to-be-detected time period, wherein the monitoring server includes a processor and a memory;

automatically extracting, by the monitoring server, a plurality of features based on a plurality of data slices corresponding to the to-be-detected time period, wherein the plurality of data slices comprise to-be-detected slices, and grouping the plurality of features into a plurality of feature groups, data of one of the to-be-detected slices comprises the time series data;

applying a plurality of the feature groups as input data of an anomaly detection model run on the processor;

automatically generating, by the monitoring server, a detection result using the anomaly detection model; and automatically determining, by the monitoring server, based on the detection result, whether the monitored indicator is abnormal, wherein the detection result indicates whether the monitored indicator is abnormal, and whether one of the feature combinations comprises a part or all of the plurality of features.

2. The method according to claim 1, wherein the plurality of features comprises one or more of the following types of features:

a time feature, a difference feature, a sequence feature, or a statistical feature, wherein the time feature identifies a feature value of the monitored indicator in the to-be-detected time period, the difference feature identifies a feature value of a difference between data of the monitored indicator in the to-be-detected time period and data of the monitored indicator in another time period, the sequence feature identifies a feature value of data in one data slice of the monitored indicator, and the statistical feature identifies a distribution feature of the monitored indicator in different data slices.

3. The method according to claim 1, wherein the plurality of data slices comprises a plurality of to-be-detected slices, one of the to-be-detected slices is obtained by sliding a time window with one preset length on a time series data column of the monitored indicator based, and preset lengths of time windows corresponding to different to-be-detected slices are different.

4. The method according to claim 1 wherein the plurality of data slices further comprises a historical same-period slice of each of one or more to-be-detected slices, and a time interval between one of the to-be-detected slices and the historical same-period slice of the to-be-detected slice is N days, and N is set to one or more preset positive integers.

5. The method according to claim 1, wherein one of the plurality of feature combinations is input data of one or more anomaly detection models, and different feature combinations are input data of different anomaly detection models, and wherein the step of the determining whether the monitored indicator is abnormal comprises:

when a quantity of detection results indicating that the monitored indicator is abnormal in detection results output by the plurality of anomaly detection models corresponding to the plurality of feature combinations reaches a preset threshold, determining that the monitored indicator is abnormal; or when a quantity of detection results indicating that the monitored indicator is abnormal in detection results output by the plurality of anomaly detection models corresponding to the plurality of feature combinations does not reach a preset threshold, determining that the monitored indicator is not abnormal.

6. The method according to claim 5, wherein algorithms of a part or all of the plurality of anomaly detection models are different, or algorithms of a part or all of the plurality of anomaly detection models are the same but values of at least one parameter comprised in the algorithms are different, and algorithms of the plurality of anomaly detection models comprise an unsupervised algorithm.

7. A computing device comprising:

a memory storing executable instructions; and a processor configured to execute the executable instructions in the memory to perform operations of:

obtaining time series data of a monitored indicator in a to-be-detected time period;

automatically extracting a plurality of features based on a plurality of data slices corresponding to the to-be-detected time period, wherein the plurality of data slices comprise to-be-detected slices, and grouping the plurality of features into a plurality of feature groups, data of one of the to-be-detected slices comprises the time series data;

applying a plurality of the feature groups as input data of an anomaly detection model run on the processor;

automatically generating a detection result by using an anomaly detection model; and automatically determining, based on the detection result, whether the monitored indicator is abnormal, wherein the detection result indicates whether the monitored indicator is abnormal, and whether one of the feature combinations comprises a part or all of the plurality of features.

8. The computing device of claim 7, wherein the plurality of features comprises one or more of the following types of features:

a time feature, a difference feature, a sequence feature, or a statistical feature, wherein the time feature identifies a feature value of the monitored indicator in the to-be-detected time period, the difference feature identifies a feature value of a difference between data of the monitored indicator in the to-be-detected time period and data of the monitored indicator in another time period, the sequence feature identifies a feature value of data in one data slice of the monitored indicator, and the statistical feature identifies a distribution feature of the monitored indicator in different data slices.

9. The computing device of claim 7, wherein the plurality of data slices comprises a plurality of to-be-detected slices, one of the to-be-detected slices is obtained by sliding a time window with one preset length on a time series data column of the monitored indicator, and preset lengths of time windows corresponding to different to-be-detected slices are different.

10. The computing device of claim 7, wherein the plurality of data slices further comprise a historical same-period slice of each of one or more to-be-detected slices, and a time interval between one of the to-be-detected slices and the historical same-period slice of the to-be-detected slice is N days, and N is set to one or more preset positive integers.

11. The computing device of claim 7, wherein one of the plurality of feature combinations is input data of one or more anomaly detection models, and different feature combinations are input data of different anomaly detection models, and wherein the operation of determining whether the monitored indicator is abnormal comprises:

when a quantity of detection results indicating that the monitored indicator is abnormal in detection results output by the plurality of anomaly detection models corresponding to the plurality of feature combinations reaches a preset threshold, determining that the monitored indicator is abnormal; or when a quantity of detection results indicating that the monitored indicator is abnormal in detection results output by the plurality of anomaly detection models corresponding to the plurality of feature combinations does not reach a preset threshold, determining that the monitored indicator is not abnormal.

12. The computing device of claim 11, wherein algorithms of a part or all of the plurality of anomaly detection models are different, or algorithms of a part or all of the plurality of anomaly detection models are the same but values of at least one parameter comprised in the algorithms are different, and algorithms of the plurality of anomaly detection models comprise an unsupervised algorithm.

13. A non-transitory computer-readable storage medium having stored thereon executable instructions that, when executed by a processor of a computing device, cause the computing device to perform operations of:

obtaining time series data of a monitored indicator in a to-be-detected time period;

automatically extracting a plurality of features based on a plurality of data slices corresponding to the to-be-detected time period, wherein the plurality of data slices comprise to-be-detected slices, and grouping the plurality of features into a plurality of feature groups, data of one of the to-be-detected slices comprises the time series data;

applying a plurality of the feature groups as input data of an anomaly detection model run on the processor;

automatically generating a detection result by using an anomaly detection model; and automatically determining, based on the detection result, whether the monitored indicator is abnormal, wherein the detection result indicates whether the monitored indicator is abnormal, and whether one of the feature combinations comprises a part or all of the plurality of features.

14. The non-transitory computer-readable storage medium of claim 13, wherein the plurality of features comprises one or more of the following types of features:

a time feature, a difference feature, a sequence feature, or a statistical feature, wherein the time feature identifies a feature value of the monitored indicator in the to-be-detected time period, the difference feature identifies a feature value of a difference between data of the monitored indicator in the to-be-detected time period and data of the monitored indicator in another time period, the sequence feature identifies a feature value of data in one data slice of the monitored indicator, and the statistical feature identifies a distribution feature of the monitored indicator in different data slices.

15. The non-transitory computer-readable storage medium of claim 13, wherein the plurality of data slices comprises a plurality of to-be-detected slices, one of the to-be-detected slices is obtained by sliding a time window with one preset length on a time series data column of the monitored indicator, and preset lengths of time windows corresponding to different to-be-detected slices are different.

16. The non-transitory computer-readable storage medium of claim 13, wherein the plurality of data slices further comprises a historical same-period slice of each of one or more to-be-detected slices, and a time interval between one of the to-be-detected slices and the historical same-period slice of the to-be-detected slice is N days, and N is set to one or more preset positive integers.

17. The non-transitory computer-readable storage medium of claim 13, wherein one of the plurality of feature combinations is input data of one or more anomaly detection models, and different feature combinations are input data of different anomaly detection models, and wherein the operation of determining whether the monitored indicator is abnormal comprises:

when a quantity of detection results indicating that the monitored indicator is abnormal in detection results output by the plurality of anomaly detection models corresponding to the plurality of feature combinations reaches a preset threshold, determining that the monitored indicator is abnormal; or when a quantity of detection results indicating that the monitored indicator is abnormal in detection results output by the plurality of anomaly detection models corresponding to the plurality of feature combinations does not reach a preset threshold, determining that the monitored indicator is not abnormal.

18. The non-transitory computer-readable storage medium of claim 17, wherein algorithms of a part or all of the plurality of anomaly detection models are different, or algorithms of a part or all of the plurality of anomaly detection models are the same but values of at least one parameter comprised in the algorithms are different, and algorithms of the plurality of anomaly detection models comprise an unsupervised algorithm.

* * * * *